United States Patent [19]

Inoue et al.

[11] Patent Number: 4,884,079

[45] Date of Patent: Nov. 28, 1989

[54] IMAGE FORMING APPARATUS AND DRIVING METHOD THEREFOR

[75] Inventors: Hiroshi Inoue, Kawasaki; Satoshi Omata, Tokyo; Yoshiyuki Osada, Yokosuka; Yutaka Inoue, Urawa; Tadashi Yamakawa, Yokohama; Hiroshi Satomura, Hatogaya, all of Japan

[73] Assignee: Canon Kabushiki Kaisha, Tokyo, Japan

[21] Appl. No.: 300,698

[22] Filed: Jan. 19, 1989

Related U.S. Application Data

[63] Continuation of Ser. No. 724,690, Apr. 18, 1985, abandoned.

[30] Foreign Application Priority Data

Apr. 25, 1984 [JP] Japan .................................. 59-83286
May 8, 1984 [JP] Japan .................................. 59-91466
May 14, 1984 [JP] Japan .................................. 59-96052

[51] Int. Cl.$^4$ ........................ G01D 15/14; G02F 1/13
[52] U.S. Cl. ................................ 346/1.1; 346/107 R; 346/160; 350/331 R; 350/333; 350/356
[58] Field of Search .................. 346/1.1, 107 R, 108, 346/160; 350/331 R, 333, 356

[56] References Cited

U.S. PATENT DOCUMENTS

| | | | |
|---|---|---|---|
| 4,281,324 | 7/1981 | Nonomura et al. | 350/333 X |
| 4,385,292 | 5/1983 | Nonomura et al. | 350/333 X |
| 4,431,271 | 2/1984 | Okubo | 350/333 X |
| 4,448,491 | 5/1984 | Okubo | 350/344 |
| 4,470,667 | 9/1984 | Okubo et al. | 350/339 F |
| 4,548,476 | 10/1985 | Kaneko | 350/350 S |
| 4,549,223 | 10/1985 | Ozawa | 350/332 X |
| 4,560,999 | 12/1985 | Tokuhara | 346/160 |
| 4,568,149 | 2/1986 | Sugata et al. | 350/334 |
| 4,569,574 | 2/1986 | Masaki et al. | 350/334 |
| 4,581,619 | 4/1986 | Mizutome et al. | 346/160 |
| 4,582,395 | 4/1986 | Morzumi | 350/334 |
| 4,586,039 | 4/1986 | Nonomura | 340/784 |
| 4,634,227 | 1/1987 | Nishimura et al. | 350/334 |
| 4,636,038 | 1/1987 | Kitahara et al. | 350/339 R |
| 4,636,817 | 1/1987 | Masaki | 346/160 |
| 4,644,338 | 2/1987 | Aoki et al. | 340/719 |
| 4,653,859 | 3/1987 | Masaki | 350/333 |
| 4,654,117 | 3/1987 | Aoki et al. | 156/659.1 |
| 4,655,651 | 4/1987 | Kanbe et al. | 350/350 S |
| 4,666,253 | 5/1987 | Yoshida | 350/334 |
| 4,675,667 | 6/1987 | Nakamura et al. | 340/784 |
| 4,676,616 | 6/1987 | Aoki et al. | 350/331 R |
| 4,697,887 | 10/1987 | Okada et al. | 350/350 S |
| 4,709,995 | 12/1987 | Karibayabbi et al. | 350/350 S |
| 4,740,782 | 4/1988 | Aoki et al. | 340/719 |

FOREIGN PATENT DOCUMENTS

| | | |
|---|---|---|
| 0079496 | 5/1983 | European Pat. Off. |
| 0083253 | 6/1983 | European Pat. Off. |
| 2126400 | 2/1980 | United Kingdom |
| 2034953 | 6/1980 | United Kingdom |
| 2121584 | 12/1983 | United Kingdom |
| 2156131 | 10/1985 | United Kingdom |

*Primary Examiner*—Joseph W. Hartary
*Attorney, Agent, or Firm*—Fitzpatrick, Cella, Harper & Scinto

[57] ABSTRACT

An image forming apparatus comprising an exposure light source, a printer head which comprises a group of micro-shutters each controlling the transmission or interruption of light from the exposure light source, and an image bearing so disposed to be irradiated with light signals transmitted through the printer head. The group of micro-shutters are arranged in a matrix comprising a plurality of rows and a plurality of columns. The group of micro-shutters are formed by a substrate having thereon a plurality of segment electrodes each forming a shutter and connected to a drain of a thin film transistor, another substrate having thereon a common electrode, and a liquid crystal interposed between the substrates. The image forming apparatus further comprises means for applying a scanning signal to the gate of the thin film transistor and applying an electric signal corresponding to image information in synchronism with the scanning signal.

39 Claims, 19 Drawing Sheets

IMAGE FORMING APPARATUS AND DRIVING METHOD THEREFOR

This application is a continuation of application Ser. No. 724,690 filed Apr. 18, 1985, now abandoned.

BACKGROUND OF THE INVENTION

The present invention relates to an image forming apparatus having a printer head incorporating a liquid crystal array in which micro-shutters are arranged into an N×M matrix array together with a light source, and a driving method therefor.

There have been well known in the art liquid crystal display devices and liquid crystal shutter arrays of the type in which a number (n) of scanning electrodes and a number (m) of signal electrodes are arranged into a matrix array and a large number of picture elements or pixels and shutter apertures are formed by a liquid crystal which is a capacitance type load element. A method for driving a liquid crystal element is such that an address signal is sequentially, periodically and selectively applied to the scanning electrodes while predetermined data or information signals are applied selectively in time series or serially in synchronism with address signals to the signal electrodes. According to this driving system, as the number of time-divisions increases, the ratio $V_{ON}$ (ON signal)/$V_{OFF}$ (OFF signal) approaches unity as indicated by the following equation:

$$\frac{V_{ON}}{V_{OFF}} = \frac{\frac{V_0}{a}\sqrt{\frac{a^2 + N - 1}{N}}}{\frac{V_0}{a}\sqrt{\frac{(a-2)^2 + N - 1}{N}}} \quad (1)$$

where
1/N: duty ratio;
1/a: bias ratio; and
$V_0$: voltage applied.

Accordingly, the shutter performance of a liquid crystal element constituting a picture element is degraded. Especially, in the case of a liquid crystal shutter array, an optical signal with a satisfactory S/N ratio cannot be obtained so that, when such driving system as described above is used in a printer head of an electrophotographic printer, there arises a problem that a high-quality image cannot be formed.

More specifically, an optimum driving condition is 1/1 duty, in other words, a static drive. In this case, it is required that each picture element is controlled by a driver circuit. For instance, in case of the liquid crystal shutter array capable of generating light spots at a density of 16 dots per millimeter in the width direction of an A-4 size (Japanese Industrial Standards: 210×297 mm), 3360 drive circuits are required and 105 IC (integrated circuit devices) are required when 32 driver circuits are made on each IC. As a result, the static drive is not adapted to drive liquid crystal shutter arrays having a high density of picture elements or shutter apertures.

As described above, an optical signal generator which is used to impart optical signals into a photosensitive drum (an image bearing member) of an electrophotographic printer comprises a liquid crystal shutter array and a light source and, in order to obtain a high-quality print or image, a high S/N ratio must be provided between the shutter ON state and the shutter OFF state. In general, an S/N ratio higher than 5 is demanded. Meanwhile, a high processing speed is demanded of electrophotographic printers in these days, but no liquid crystal shutter array capable of allowing such a high processing speed has been provided yet.

SUMMARY OF THE INVENTION

In view of the above, a principal object of the present invention is to overcome a problem that the production cost cannot be reduced because, the breakdown voltage of the ICs must be increased in order to increase the number of time-divisions without lowering the processing speed or without increasing the number of driving ICs. So far, even when the processing speed (image forming speed) is lowered, the number of time-divisions has been 4 at the highest. Therefore, another object of the present invention is to provide an image forming apparatus and a driving method therefor which can increase the number of time-divisions without causing lowering in processing speed by incorporating a less expensive, but high performance liquid crystal shutter array.

A further object of the present invention is to provide a driving method for a transistor, especially a thin film transistor, which is especially adapted for use in a liquid crystal shutter array adapted for use in a high processing speed electrophotographic printer.

The present invention provides an image forming apparatus comprising an exposure light source, a printer head which comprises a group of micro-shutters each controlling the transmission or interruption of light from said exposure light source, and an image bearing so disposed to be irradiated with light signals transmitted through the printer head. The group of micro-shutters are arranged in a matrix comprising a plurality of rows and a plurality of columns. The group of micro shutters are formed by a substrate having thereon a plurality of segment electrodes each forming a shutter and connected to a drain of a thin film transistor, another substrate having thereon a common electrode, and a liquid crystal interposed between the substrates. Furthermore, the image forming apparatus further comprises means for applying a scanning signal to the gate of the thin film transistor and applying an electric signal corresponding to image information in synchronism with the scanning signal.

The above and other objects, effects, features and advantages of the present invention will become more apparent from the following description of some preferred embodiments thereof taken in conjunction with the accompanying drawings.

BRIEF DESCRIPTION OF THE DRAWINGS

FIG. 8 shows a time serial variation in transmittance when a shutter is turned on;

DETAILED DESCRIPTION OF THE PREFERRED EMBODIMENTS

Now, the present invention will be described in detail with reference to the accompanying drawings.

Figure 1:
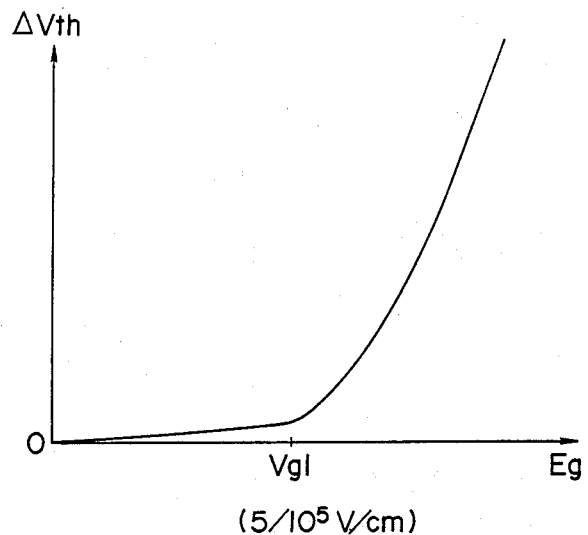
FIG. 1 is a graph showing a relationship between a gate insulating film and $\Delta V_{th}$.

According to extensive studies and experiments conducted by the inventors, it has been found that, as shown in FIG. 1, when an electric field strength Eg applied to a gate insulating film exceeds a low level gate voltage $Vg_1$ (about 40–60 V), $\Delta Vth$ increases exponentially, where $\Delta Vth$ is a variation in a threshold voltage Vth caused by the application of a DC gate voltage Vg DC per unit time (hour). This means that, when the gate voltage Vg exceeds $Vg_1$, the lifetime is rapidly reduced. However, if the field strength applied to the gate insulating film is maintained at less than $5 \times 10^5$ V/cm, the gate voltage Vg can be increased without reducing the lifetime of a thin film transistor and therefore an optical signal with a satisfactory S/N ratio or more preferably an optical signal with an S/N ratio higher than 5 can be produced.

A thin film transistor is used in the nonsaturated region where $Vg-Vth>Vs$ (where Vg: gate voltage; Vth: threshold voltage; and Vs: data voltage) and, in this region $Vx(t)/Vs$ (where $Vx(t)$=output voltage) prior to the charging (t=0) is expressed by the following equation:

$$\frac{Vx(t)}{vs} = \frac{1 - L[\exp - (1 - m)t/\tau]}{1 - Lm \exp[-1(1 - m)t/\tau]} \quad (2)$$

where m, $\tau$ (charging time constant of the thin film transistor), and L (residual voltage of liquid crystal) are expressed in the following equations:

$$m = Vs/2(Vgh - Vth) - Vs \quad (3)$$

$$\tau = \frac{m}{KVs} C \quad (4)$$

$$L = \frac{1 - Vx(0)/Vs}{1 - mVx(0)/Vs} \quad (5)$$

In the equations,
C denotes a load capacitance;
Vbh a gate voltage on the positive side;
t=gate-on time.
Further, K is expressed by the following equation:

$$K = \frac{W}{2L} \cdot \frac{1}{d_{ins}} \cdot \epsilon_0 \cdot \epsilon_s \cdot \mu \quad (4a)$$

where
$\epsilon_0$: dielectric constant in vacuum (F/cm);
$\epsilon_s$: specific inductive capacity of an insulating film;
$\mu$: mobility (cm$^2$/Vsec)
$d_{ins}$: thickness (cm) of an insulating layer;
L: channel length (cm); and
W: channel width (cm).

Eq. (2) shows that, in order to increase the output power Vx(t), the data voltage Vs must be increased and, because of the relationship of $Vg-Vth>Vs$, the gate voltage Vg must be increased.

However, the increase in gate voltage Vg results in decrease in lifetime of a TFT (thin film transistor). Therefore, there is a demand for a TFT-matrix time-division drive method, by which an output voltage Vx(t) of higher than 20 volts is obtained especially without reducing the lifetime of the thin film transistor.

In view of the above, we have conducted extensive studies and experiments and arrived at a TFT-matrix time-division drive method which can permit the application of a high gate voltage Vg (for instance, higher than 30 volts and especially 40–60 volts) without reducing the lifetime of the TFT.

Thus, according to the present invention, a satisfactory lifetime of a TFT can be maintained by setting the thickness of a gate insulating film in such a way that a field strength of less than $5 \times 10^5$ V is applied to the gate insulating film of the TFT when the gate thereof is turned on. In a preferred embodiment of the present invention, the gate insulating film is formed of silicon nitride doped with hydrogen atoms (relative dielectric constant: 6.6) of 6000 Å in thickness and a semiconductor film is formed of amorphous silicon (relative dielectric constant: 12) of 2000 Å in thickness. As a result, it has been confirmed that, even when the gate voltage Vg is increased to 40–60 volts, the lifetime of the TFT is not reduced at all.

Figure 2:
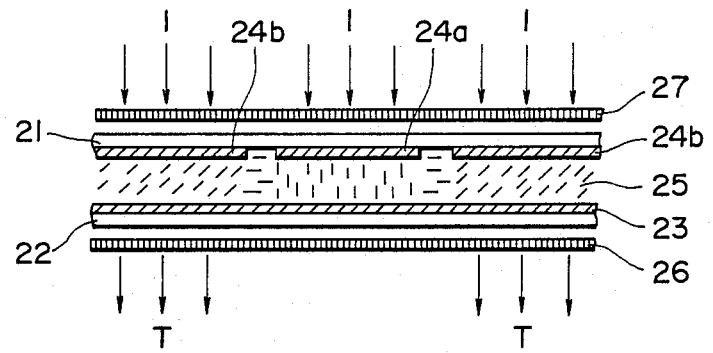
FIG. 2 is a partial sectional view of a liquid crystal device used in the present invention.

FIG. 2 is a schematic sectional view illustrating an operational mode of a liquid crystal device which can be used in the present invention. Polarizers 26 and 27 are disposed in cross-nicol relationship to each other and two substrates 21 and 22 are so oriented by a rubbing process or the like that the initial orientation of a liquid crystal 25 forms an angle of 45° relative to the polarization directions of the polarizers 26 and 27. The liquid crystal 25 used is a nematic liquid crystal (NP type liquid crystal) having a positive dielectric anisotropy. When a voltage is applied between a common electrode 23 and an electrode 24a, the axes of molecules of liquid crystal 25 therebetween are oriented in the direction of an electric field applied to form a dark state (or light-interrupting state) with respect to incident light rays I. On the other hand, a voltage lower than the threshold voltage of the liquid crystal 25 is applied between the electrode 23 and an electrode 24b, the axes of molecules of liquid crystal 25 between them are oriented in the direction of the initial orientation; that is, in the rubbed direction. As. a result, the incident light rays I transmit the liquid crystal 25 to form a transmitted light T. In other words, the liquid crystal 25 is oriented into the light transmission state.

Figure 3A:
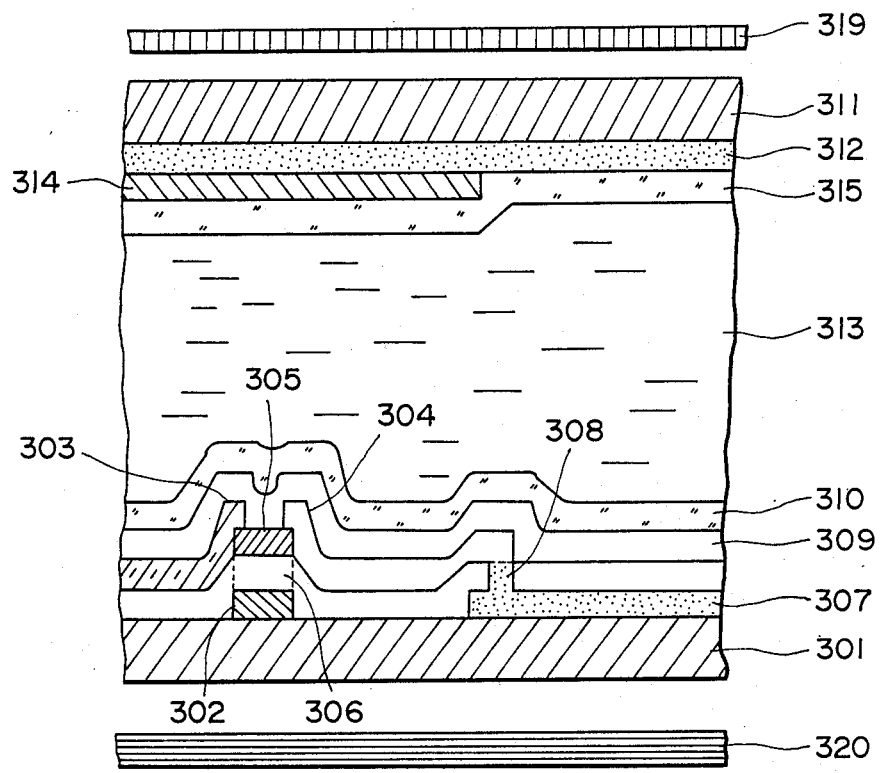
FIG. 3A is a sectional view of a liquid crystal device incorporating a thin film transistor in accordance with the present invention.

FIG. 3A is a partial sectional view of a liquid crystal device used in the present invention, in which a TFT is formed on a substrate 301 (glass, plastic or the like) The TFT has a gate electrode 302 connected to a gate line (scanning line) to which is applied a scanning signal, a source electrode 303 connected to a data line to which is applied an information signal and a drain electrode 304 for deriving a data signal as an output signal. The drain electrode 304 is connected to a segment electrode 307 constituting a micro-shutter. Upon application of the scanning signal to the gate electrode 302, the resistance of an amorphous silicon film 305 is lowered so that the source electrode 303 and the drain electrode 304 are electrically interconnected to each other.

In the TFT used in the present invention, a gate insulating layer 306 is interposed between the gate electrode 302 and the amorphous silicon film 305 and is formed of silicon nitride doped with hydrogen atoms (relative dielectric constant: 6.6) of 6000 Å in thickness. The silicon nitride film is formed by glow discharge over the whole surface of the substrate 301 upon which have been formed a predetermined pattern of the gate electrode 302 of a chrominum-aluminum lamination film deposited by a vacuum deposition process and a predetermined pattern of the segment electrode 307 of Indium tin oxide (ITO) deposited by a vacuum deposition process. The drain electrode 304 and the segment electrode 307 are electrically interconnected to each other through a through hole 308 formed through the silicon nitride film.

Furthermore, an insulating film 309 of silicon nitride doped with hydrogen atoms and an orientation control film 310 are formed in the order named over the substrate 301 over which are formed the TFT and the segment electrode as described above. The orientation control film 310 may be, for instance, a polyimide film of 1000 Å in thickness.

In the liquid crystal device used in the present invention, a nematic liquid crystal 313 (NP type liquid crystal) is interposed in alignment states as explained with reference to FIG. 2 between a TFT-matrix substrate with a matrix of TFTs of the type described above and an opposing substrate 311. An ITO film forming a common electrode 312 is formed on the opposing substrate 311. In the case of the liquid crystal shutter array of the type described before, a light shielding film 314 formed of a vacuum deposited chrominum/aluminum lamination layer is formed on the opposing electrode 312 so as to optically shield a portion except an aperture, thereby defining a micro-shutter. A orientation control film 315 of, e.g., polyimide is formed over the common electrode 312 and the light shielding film 314.

Figure 3B:
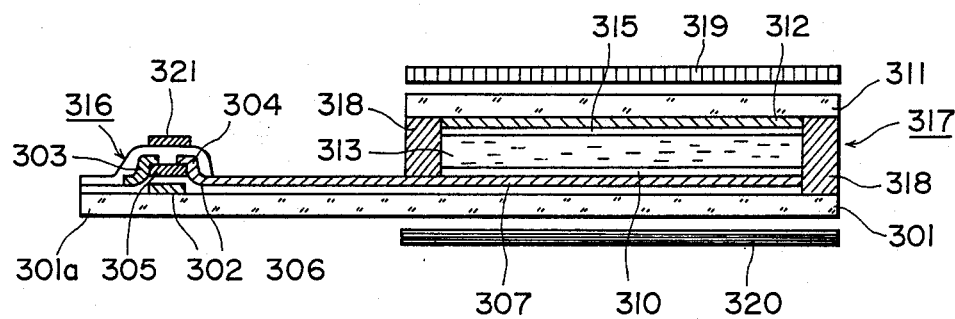
FIG. 3B is a sectional view of another liquid crystal device used in the present invention.

FIG. 3B is a schematic sectional vie of a liquid crystal shutter array used in the present invention. In this embodiment of the present invention, a TFT region 316 is formed on the same substrate 301 of a liquid crystal device 317, but is spaced apart therefrom. It is preferable that the TFT 316 is formed at the exterior of a sealing member 318 of an epoxy adhesive for sealing the liquid crystal 313 between the substrate 301 and the opposing substrate 311 with the common electrode 312. Alternatively, the TFT 316 may be formed on a separate board with an exterior circuit as an I circuit (not shown) instead of being formed on the substrate 301 of the liquid crystal device 317. It is to be noted that same reference numerals are used to designate similar parts throughout FIGS. 3A and 3B. Cross-nicol polarizers 319 and 320 are disposed above and below the substrates 311 and 301, respectively, and a chrominum or aluminum light shielding film 321 is formed above the semiconductor film 305 of the thin film transistor 316.

Figure 4A:
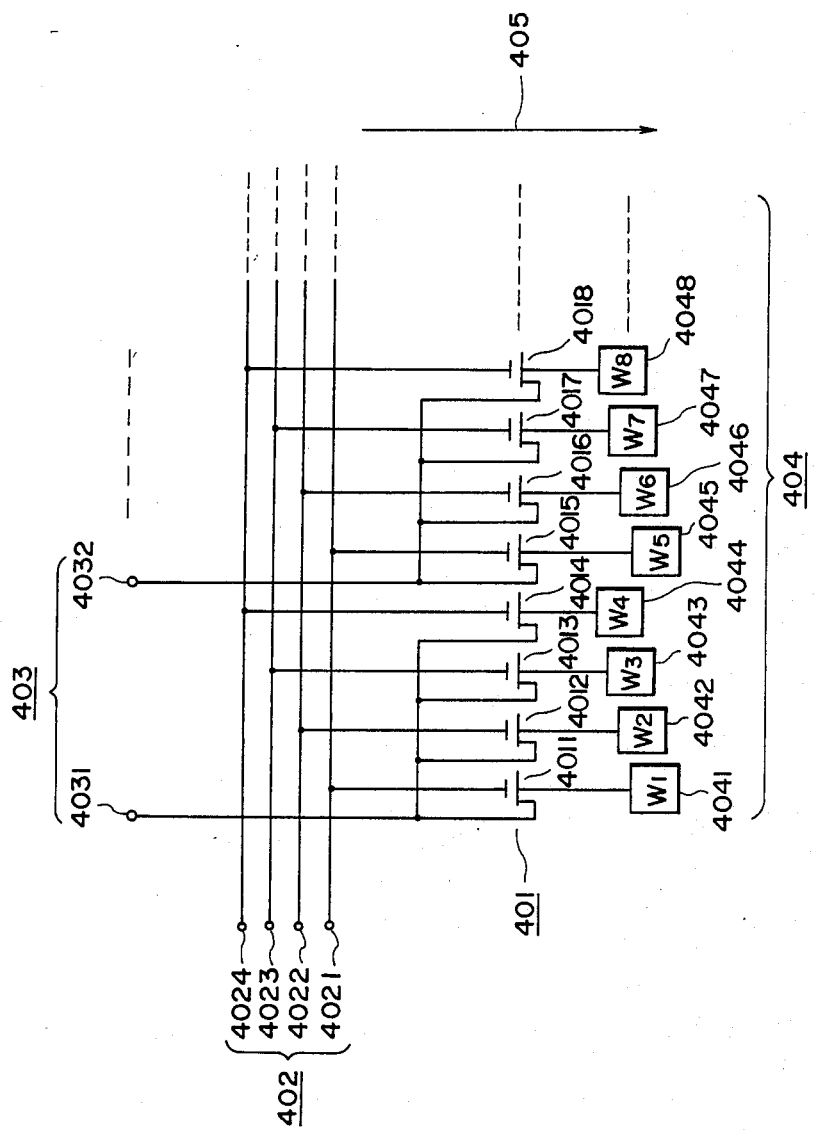
FIG. 4A is an explanatory view illustrating an equivalent circuit of a liquid crystal shutter array in accordance with the present invention.
Figure 4B:
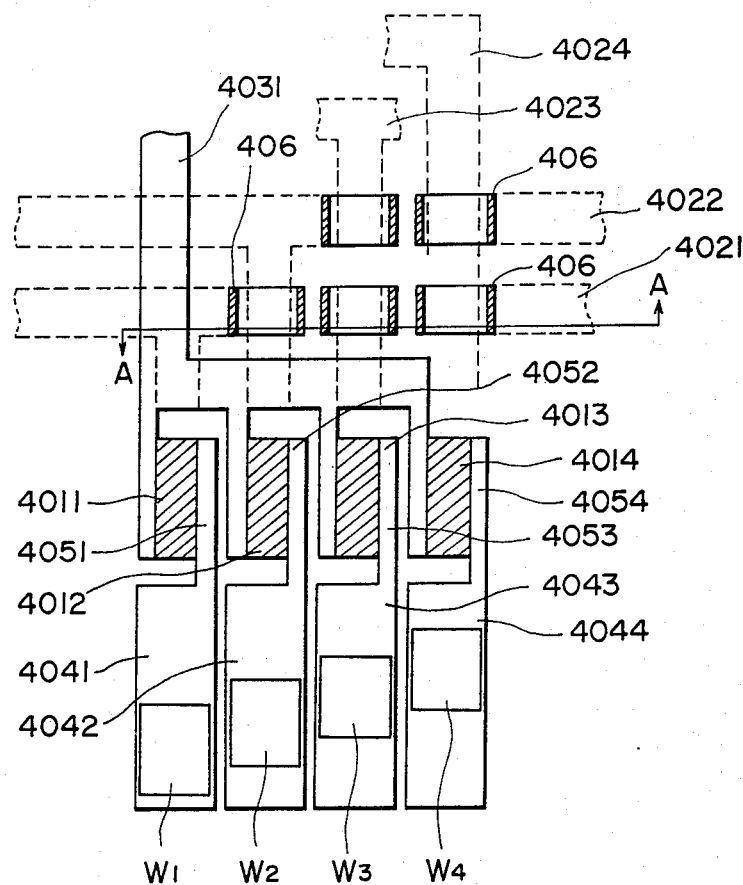
FIG. 4B is a plan view of a liquid crystal shutter array in accordance with the present invention.

FIG. 4A shows a circuit diagram of a TFT-matrix substrate used in the liquid crystal shutter array in accordance with the present invention and FIG. 4B is a plan view thereof. A TFT-matrix 401 comprises thin film transistors 4011, 4012, 4013, 4014, 4015, 4016, 4017, 4018, . . . arranged in an array. The TFT array or matrix 401 is connected to a gate-line group 402 comprising gate lines 4021, 4022, 4023 and 4024 for applying scanning signals to gate electrodes, a data-line group consisting of data lines 4031, 4032, . . . for applying data signals to source electrodes, and a micro-shutter-segment-electrode group 404 (comprising electrodes 4041, 4042, 4043, 4044, 4045, 4046, 4047, 4048, . . . ) connected to drain electrodes to which are applied as output signals the data signals from the data-line group 403.

In this embodiment, the data line 4031 is connected in common to the four TFTs 4011, 4012, 4013 and 4014 and, in like manner, the data line 4032 is connected in common to the four TFTs 4015, 4016, 4017 and 4018. The gate line 4021 is connected in common to the two TFTs 4011, 4015, . . . and, in like manner, the gate lines 4022, 4023 and 4024 are connected in common to the respective TFTs as shown. In this embodiment, a four time-division drive system is described, but it is to be understood that the present invention may employ a two, three, five or further large number of time-division drive system.

In the case of the above-described TFT-matrix, a gate electrode (including a leading gate electrode for connecting the gate electrode and the gate line) does not overlap a segment electrode connected to a drain electrode so that an undesirable capacitance $C_0$ caused by overlapping of the gate electrode and the segment electrode can be eliminated.

The segment electrodes 4041, 4042, . . . of the micro-shutters are staggered or deviated in the up-and-down direction as seen in FIG. 4A because of the following reason. Since the data are sequentially written into the micro-shutters, data can be written linearly in one frame on a photosensitive drum or an image bearing member (not shown) which is always moving in the subordinate scanning direction indicated by an arrow 405.

Figure 4C:
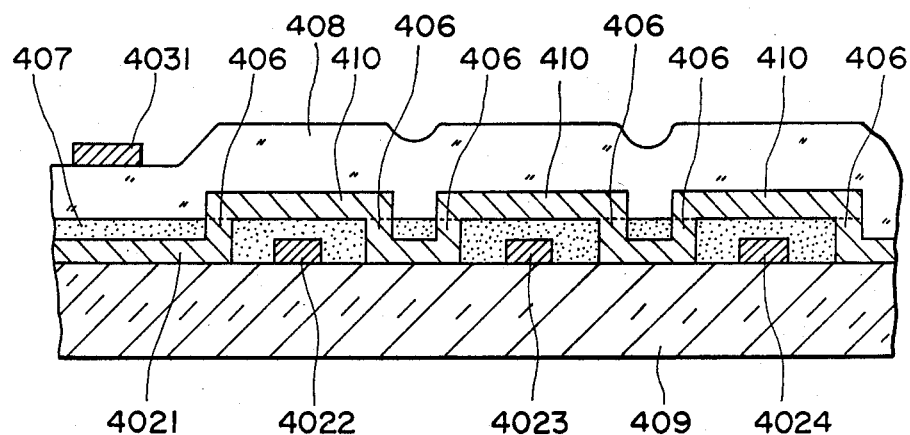
FIG. 4C is a sectional view taken along the line A—A of FIG. 4B.

FIG. 4C is a sectional view taken along the line A—A in FIG. 4B. An insulating film 407 is formed over the whole surface of the gate line 4021 formed on a substrate 409, and the gate line retains its electrical connection through contact holes 406 and conductor films 410, passing above and intersecting with the gate lines 4022, 4023 and 4024.

An insulating film 408 is formed over the intersected gate lines and the data line 4031 is formed over the insulating film 408.

Figure 5:
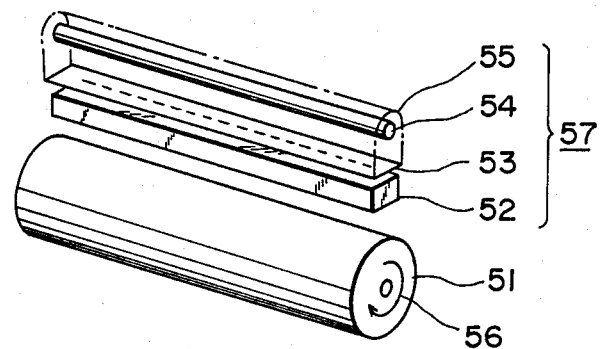
FIG. 5 is a schematic perspective view of a printer head used in the present invention.

FIG. 5 schematically shows an arrangement for casting the optical signals upon a photosensitive drum through a liquid crystal shutter array, but it should be noted that a charger, a developing device, a cleaning device and so on are not shown. Reference numeral 53 designates a liquid crystal shutter array of the type described above; 51, a photosensitive drum (amorphous silicon photosensitive member or organic photoconductive photosensitive member); 52, a lens array such as Selfoc lens; 54, a light source such as a fluorescent lamp; and 55, a reflector. The photosensitive drum 51 is rotated in the subordinate scanning direction indicated by an arrow 56 and the optical signals emitted from a printer head 57 comprising the liquid crystal shutter array 53 and the light source 54 are focused over the cylindrical surface of the photosensitive drum 51, whereby an electrostatic latent image corresponding to data signals is formed. As a result, the image forming apparatus in accordance with the present invention can be made compact in size as compared with a laser beam type electrophotographic printer. Moreover, the present invention can eliminate mechanically driven component parts such as a polygon scanner used in a laser beam type electrophotographic printer so that noise can be suppressed to a minimum. Furthermore, there is an advantage that severe dimensional precision demanded for mechanical parts can be considerably relaxed.

Next, an example of forming a dot pattern by the four time-division drive of the shutter apertures $W_1$, $W_2$, ... arranged as shown in FIG. 4 will be described.

Figure 6:
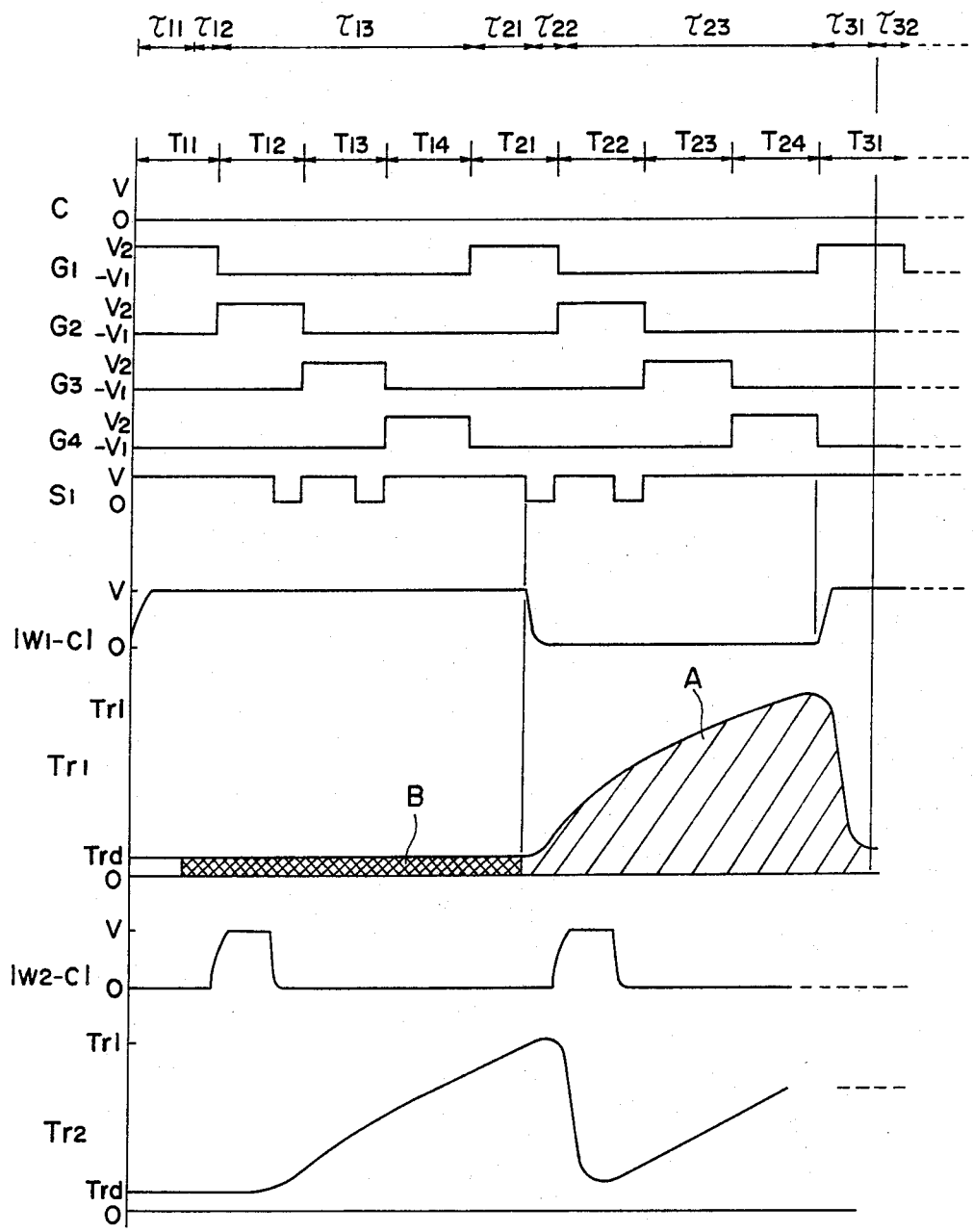
FIG. 6 is a time chart of driving signals applied to a liquid crystal shutter array in accordance with the present invention.

FIG. 6 is a time chart of drive signals applied to the liquid crystal shutter array. The curves preceded by symbols $G_1$–$G_4$ show voltage waveforms applied to the gate lines 4021, 4022, 4023 and 4024. Upon application of a potential $V_2$, a TFT is turned on so that the source electrode and the drain electrode are electrically connected to each other. Upon application of a potential $-V_1$, the TFT is turned off so that the source electrode is electrically disconnected from the drain electrode. As a result, when a voltage $V_2$ is applied to the gate electrode, the potential of the segment electrode connected to the drain electrode of the TFT changes to a potential applied to the data line connected to the source electrode of the TFT. When the voltage applied to the gate electrode is changed to $-V_1$, the potential applied to the data line immediately before the voltage $-v_1$ is applied to the gate electrode is maintained on the segment electrode.

Still referring to FIG. 6, C shows a voltage waveform applied to the common electrode which is maintained at the ground potential 0 in this embodiment. $S_1$ shows a voltage waveform applied to the source electrode (data electrode) and the potential $S_1$ changes between 0 and V depending upon whether the apertures $W_1$, $W_2$, ... are turned on or off.

Next, the control for opening and closing the shutter aperture $W_1$ will be described in detail.

At a time $T_{11}$, the potential of the gate electrode connected to the gate line 4021 ($G_1$) of the TFT 4011 connected to the segment electrode 4041 of the micro-shutter $W_1$ becomes $V_2$ and the TFT 4011 is turned on. During a time $\tau_{11}$ and during a time $\tau_{12}$ ($\tau_{11}+\tau_{12}T_{11}$), the potential of the data electrode 4031 ($S_1$) is V so that the potential of the segment electrode 4041 of the micro-shutter $W_1$ is also almost V. In this case, therefore, the micro-shutter remains turned off. During a time $\tau_{13}$, the potential of the gate electrode connected to the gate line 4021 ($G_1$) becomes $-V$ so that, even when a voltage is applied to the data electrode 4031 ($S_1$), the segment electrode of the micro-shutter $W_1$ is maintained at a potential of V. During $\tau_{13}$ ($=T_{12}+T_{13}+T_{14}$), a voltage $V_2$ is applied to the gate line 4022 ($G_2$) at $T_{12}$, to the gate line 4023 ($G_3$) at $T_{13}$ and to the gate line 4024 ($G_4$) at $T_{14}$. It follows therefore that a time period of $T_{11}+T_{12}+T_{13}+T_{14}$ is one frame period. At $T_{21}$ in the succeeding frame period, the potential of the gate electrode ($G_1$) becomes $V_2$ again and the TFT 4011 is turned on. During the first half period $\tau_{21}$ of the time $T_{21}$, the potential of the data electrode ($S_1$) becomes V and the voltage V is applied to the segment electrode of the micro-shutter $W_1$. During the succeeding second half period $\tau_{22}$ (when the TFT remains turned on), the potential of the data electrode ($S_1$) becomes zero (0) so that the potential of the segment electrode of the micro-shutter $W_1$ changes to 0 and is maintained at zero (0) during the succeeding time period $\tau_{23}$ ($=T_{22}+T_{23}+T_{24}$). As a consequence, the voltage applied across the liquid crystal of the microshutter $W_1$ is zero (0) so that the shutter is kept turned on (to permit the transmission of light) during one frame period.

The curse preceded by $|W_1-C|$ in FIG. 6 shows in time series a voltage waveform applied between the segment electrode of the micro-shutter $W_1$ and the common electrode; that is, across the liquid crystal. Therefore, during $\tau_{12}+\tau_{13}+\tau_{21}$, the voltage curve $|W-C|$ shows a potential difference of V. During $\tau_{22}+\tau_{23}$ in the succeeding frame period, $|W_1-C|$ shows a potential difference 0. The curve $Tr_1$ in FIG. 6 clearly shows the time serial variation in transmittance of the micro-shutter $W_1$. During $\tau_{12}+\tau_{13}+\tau_{21}$, the transmittance of the micro-shutter $W_1$ is Trd (dark level) and, during $\tau_{22}+\tau_{23}+\tau_{31}$, the transmittance of the micro-shutter $W_1$ is gradually increasing to $Tr_1$ (bright level). During $\tau_{31}$ in the succeeding frame period, $|W_1-C|$ becomes V and the transmittance returns to Trd as shown.

The curve $|W_2-C|$ in FIG. 6 shows a time serial voltage difference between the electrode of the micro-shutter $W_2$ and the common electrode. $Tr_2$ shows the variation in transmittance during this time.

Figure 7:
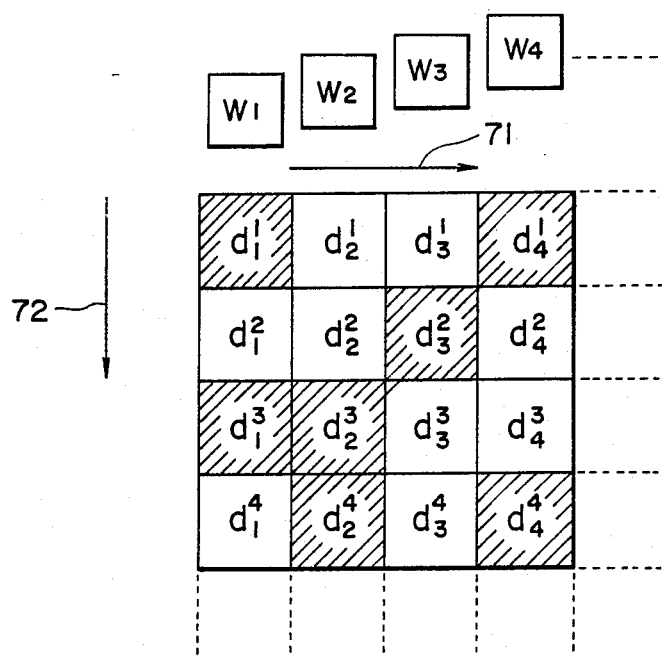
FIG. 7 is a view for explaining the sequence of forming dots by a liquid crystal shutter array in accordance with the present invention.

FIG. 7 shows a sequence for forming dots $d_1{}^1$ and $d_1{}^2$ of a light-spot pattern. The dots ($d_1{}^1$, $d_1{}^2$, $d_1{}^3$, $d_1{}^4$ ... ) in the first column correspond to "ON" states and "OFF" states of the micro-shutter $W_1$; and the dots ($d_2{}^1$, $d_2{}^2$, $d_2{}^3$, $d_2{}^4$ ... ) in the second column correspond to "ON" states and "OFF" states of the micro-shutter $W_2$. The dots in respective rows correspond to the microshutters $W_1$, $W_2$, $W_3$, $W_4$, ... The dots $d_1{}^1$, $d_4{}^1$, $d_3{}^2$, $d_1{}^3$, $d_2{}^3$, $d_2{}^4$, and $d_4{}^4$ are at a dark level, while the remaining dots are at a bright level. Reference numeral 71 designates the main scanning direction; and 72, the subordinate scanning direction.

When the four time-division drive scheme of the type described above is used, for instance, for driving the micro-shutters, some micro-shutters can be maintained in the ON state (light transmitting state) while the remaining micro-shutters can be maintained in the OFF state (light interrupting state) in one frame period.

More particularly, in order to drive a dot d to a dark level, its transmittance is maintained at a dark level (Trd) during a time period for generating the dots in one row ($\tau_{12}+\tau_{13}+\tau_{21}$) and in order to generate a bright dot, its transmittance is maintained at a bright level (Tr$_1$) during a time interval for generating the dots in one row ($\tau_{22}+\tau_{23}+\tau_{31}$). In this case, the bright/dark ratio; that is, S/N ratio corresponds to the ratio between the area A and the area B shown in FIG. 6. It should be noted therefore that the S/N ratio can be considerably improved as compared with a simple matrix system used in a conventional liquid crystal shutter array.

Figure 8:
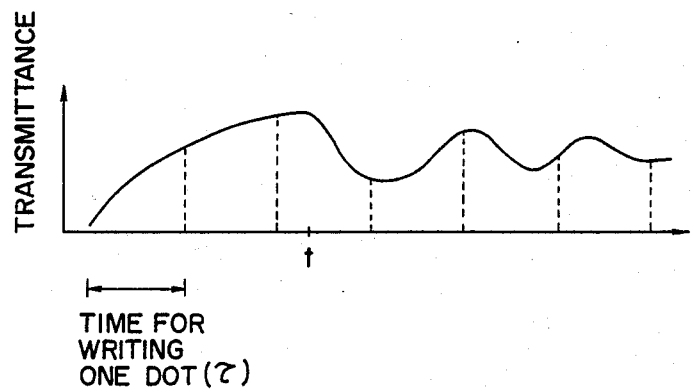

In this embodiment, as shown in FIG. 6, during the initial period during which the gate lines are scanned, a voltage V is added to the information or data signal applied in synchronism with the scanning signal. When a voltage 0 is applied across the liquid crystal of the type shown in FIG. 2, the transmittance varies like a wave in time as shown in FIG. 8. This phenomenon is in generally called "light bouncing phenomenon". It follows therefore, as shown in FIG. 8, when one micro-shutter remains in "ON" state during a time interval of 3$\tau$ the transmittance drops after t. As a result, there arises a problem that the transmittance varies at each writing so that the bright-dark ratio (contrast of a printed image) of each dot varies. Therefore, according to this embodiment, in order to maintain a uniform transmittance when the micro-shutter is turned on, during the initial period of writing, a voltage V is added to the data signal applied in synchronism with the scanning signal so that the voltage V is forced to be applied across the liquid crystal and consequently the liquid crystal is forced to be driven into the "dark state". Therefore, even when the micro-shutter remains in the "ON" state, the transmittance obtained when one dot is written during a time interval $\tau$ is obtained so that all the dots have a uniform transmittance when the micro-shutters are turned on.

Therefore, according to this embodiment, a time for forcing the micro-shutter to be closed is provided immediately before or after a writing time so that it becomes possible to always obtain a stable transmittance when the micro-shutter is opened and closed when data is written, whereby a printed image having a stable contrast can be always obtained. Prior to the application of the data signal to the data electrode in order to form a dot, it is possible to apply a signal in such a way that a voltage is applied across a liquid crystal regardless of the fact that the previously formed dot is at a bright level or a dark level. In this case, there must be provided a time interval $\tau_{11}$ during which a voltage is applied across a liquid crystal layer so that its transmittance is sufficiently reduced and a time interval $\tau_{12}$ must be such that the potential of the segment electrode 404 can completely change to the potential of the data electrode 403 through the TFT 401.

The results of the experiments conducted by us show that, in the case of the application of a voltage of 20 V across a liquid crystal 8 micrometers in length, a time interval $\tau_{11}$ of about 0.24 milli-seconds, i.e., longer than 0.2 milli-seconds, suffices; a time interval $\tau_{12}$ of tens micro-seconds suffices; and a time interval $\tau_{11}+\tau_{12}$ about 0.3 milli-seconds suffices. When the aperture (micro-shutter) density is 16 dots per millimeter and the image forming speed (processing speed) is 50 mm/sec, then the time interval ($\tau_{11}+\tau_{12}+\tau_{13}$) required for forming the dots in one row becomes 1.25 msec. As a result, it has become apparent that the four time-division drive can be realized by setting the time period $\tau_{11}+\tau_{12}$ to one quarter of 1.25 msec or to 0.3125 msec. Furthermore, it has also become apparent that the bright/dark ratio can be increased to 6.5 and that the quantity of light obtained at a bright level is more than twice as high as that obtained by the conventional simple matrix drive system.

Figure 9:
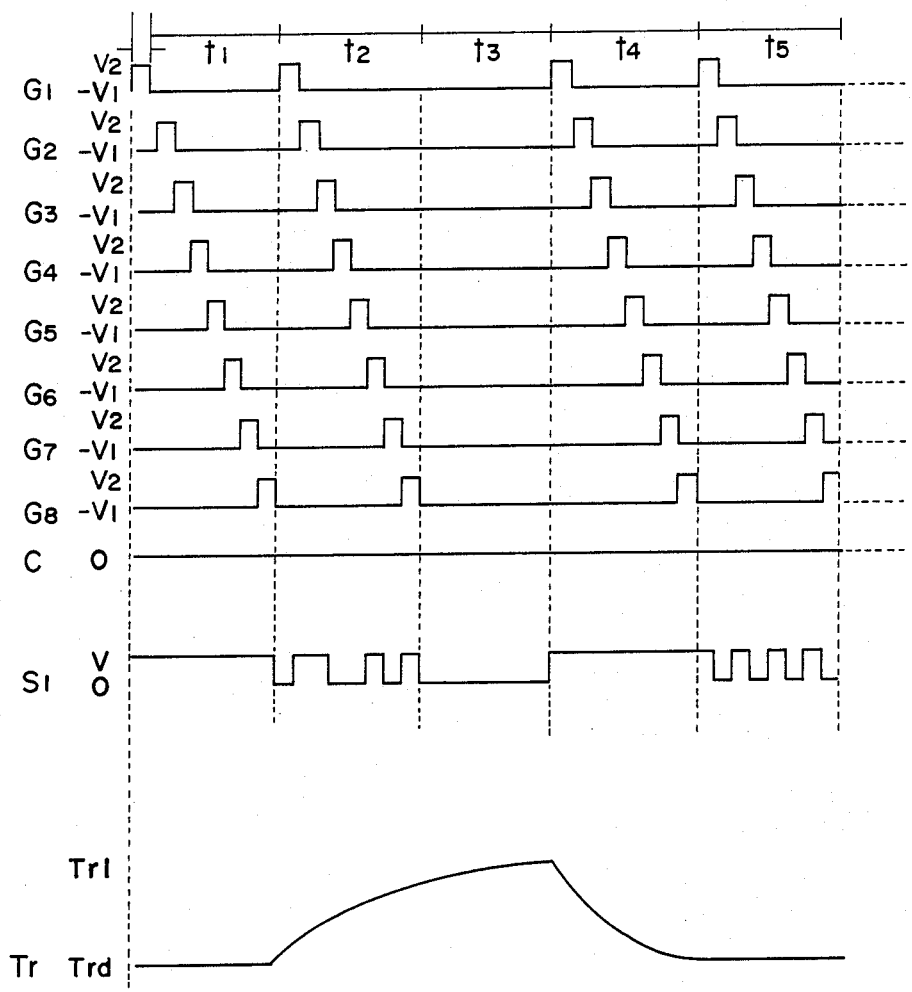
FIGS. 9, 10 and 11 are time charts for applying driving signals in accordance with another embodiment of the present invention.

FIG. 9 shows another embodiment of the time-division drive system in accordance with the present invention which is adapted to a case where the number of time-division is increased further.

In the case of the drive scheme as shown in FIG. 6, during a time interval consisting of the time interval $\tau_{11}$ (during one frame) required for changing the transmittance of the aperture from a bright level Tr$_1$ to a dark level Trd and the minimum gate-on-time $\tau_{12}$ (the minimum time required for obtaining the voltage of the data electrode at the drain electrode), the gate electrode is kept turned on. As a result, the number of time-division is limited. It is assumed that the aperture density is 16 dots per mm and the processing speed is 50 mm/sec. Then, the number of time-division is given by Eq. (6):

$$n = \frac{1.25 \text{ (msec)}}{\tau_{11} \text{ (msec)} + \tau_{11} \text{ (msec)}} = \frac{1.25 \text{ (msec)}}{0.2 \text{ (msec)} + \tau_{12}} \quad (16)$$

The time interval $\tau_{12}$ of a few micro seconds to tens of micro seconds suffices and the number (n) of time-division number is dependent upon $\tau_{11}$.

Therefore, as shown in FIG. 9, during a time interval for forcibly closing the micro-shutter (in our experiments, $\tau_{11}=0.24$ msec; the thickness of a liquid crystal = 8 micro-meters; and the driving voltage = 40 V), gate-on pulses are sequentially applied to the gate lines G$_1$, G$_2$, G$_3$, ..., and G$_n$ (n : number of time-division) and in synchronism with the gate-on pulses, the voltage V is applied to the data electrodes. Therefore, the micro-shutters are sequentially turned off and in the succeeding frame period, the selection signal (voltage of 0 or V) is applied to the data electrodes. That is, during the first scanning time t$_1$, a voltage V (the potential of the common electrode is assumed to be 0) is applied across the liquid crystal of the micro-shutter so that all the micro-shutters are turned off. The first scanning time t$_1$ corresponds to a refresh time. In the second scanning time t$_2$, a voltage depending upon the data signal is applied to the data electrode in synchronism with the scanning signal ($\tau_1$) applied to the gate line so that a predetermined micro-shutter is turned on or off. The second scanning time t$_2$ corresponds to a data writing time.

In the case of the drive system as shown in FIG. 9, the above-described refresh time and the data writing time alternate, and a suitable voltage application time t$_3$ is provided between the refresh time and the data writing time. However, this voltage application time t$_3$ can be eliminated. In the case of the drive system of the type described above, the number (n) of time-division is given by Eq. (7):

$$n = \frac{\text{frame period } t_1 \text{ (msec)}}{\text{time interval } \tau_1 \text{ (msec) for applying}} \quad (7)$$
$$\text{the scanning signal to the gate line}$$

It is assumed that the frame period t$_1$ is 0.24 msec and the minimum gate-on time (time $\tau_1$ for applying the scanning signal) is 5 micro seconds. Then, it is possible to obtain the number of time-division of 48. In FIG. 9, Tr shows a time serial variation in transmittance of a shutter which is switched by the gate line G$_1$ and the thin film transistor connected to the data electrode $S_1$. ($Tr_1$ : a bright level and $Tr_d$ : a dark level).

Figure 10:
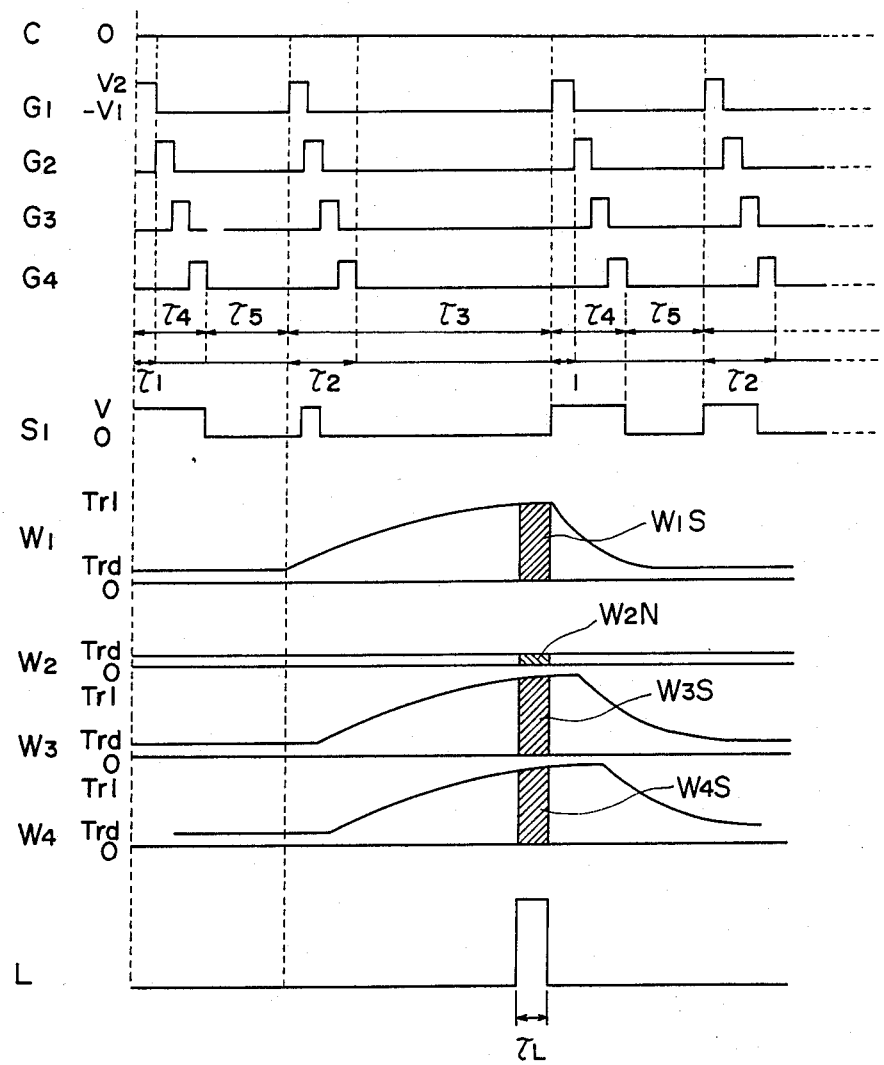

FIG. 10 shows a still another drive system in accordance with the present invention. In the case of the drive system of the type as shown in FIG. 9, the gate-on pulse is always applied to one TFT during the time $t_1$ and the TFT is turned on, but in the drive system shown in FIG. 10, the number of time-division is reduced (number of time-division n =4). As a result, the data pulse application time can be shortened. That is, a drive time difference between the time when the micro-shutter $W_1$ is first driven and the time when the micro-shutter $W_4$ is driven last can be shortened as indicated by the transmittance waveforms of the micro-shutters $W_1$, $W_2$, $W_3$ and $W_4$ (corresponding to the apertures in FIG. 4).

In FIG. 10, L shows a waveform of light emitted from a light source. Then, the energies of light transmitted through the respective apertures which are turned on are represented by the areas $W_1S$, $W_2N$, $W_3S$ and $W_4S$, respectively. In this case, the apertures $W_1$, $W_3$ and $W_4$ are turned on so that $W_1S > W_3S > W_4S$, but as described above, the data pulse application time $\tau_2$ is short so that the differences between the energies of the transmitted light is almost negligible. For instance in the case of the four time division drive under the conditions that the aperture (shutter) density is 16 dots per millimeter; the processing speed is 50 mm/sec and the minimum gate-on time $\tau_1$ is 5 $\mu$sec, the data pulse application time $\tau_2$ becomes 20 $\mu$sec. The time $\tau_3$ is of the order of 1 msec. It follows therefore that the differences among the light energies $W_1S$, $W_3S$ and $W_4S$ due to such a short time difference is almost negligible.

When the light source is turned on (or the quantity of light is instantaneously increased) immediately before the refresh pulse (the refresh pulse application time: $\tau_4$) is applied to the first gate, the S/N ratio becomes $W_4S/W_2N$ even in the worst case. It is now assumed that the center wavelength of light emitted from the light source is of the order of 650 nm; the aperture density is 16 dots per millimeter; the processing speed is 50 mm/sec; and the light source is turned on for a time $\tau_L$ of 200 $\mu$sec. Then, $W_1S/W_2N$ becomes 10 times or higher. Since the data pulse application time $\tau_2$ is provided, S/N ratio ($W_4S/W_2N$) is degraded more or less but, when the time $\tau_2$ is so set that the energy difference between $W_1S$ and $W_4S$ becomes less as described hereinbefore, S/N ratio can be remarkably improved and consequently a stable electrophotographic print image can be obtained. In FIG. 10, a time interval $\tau_5$ may be suitably selected.

Figure 11:
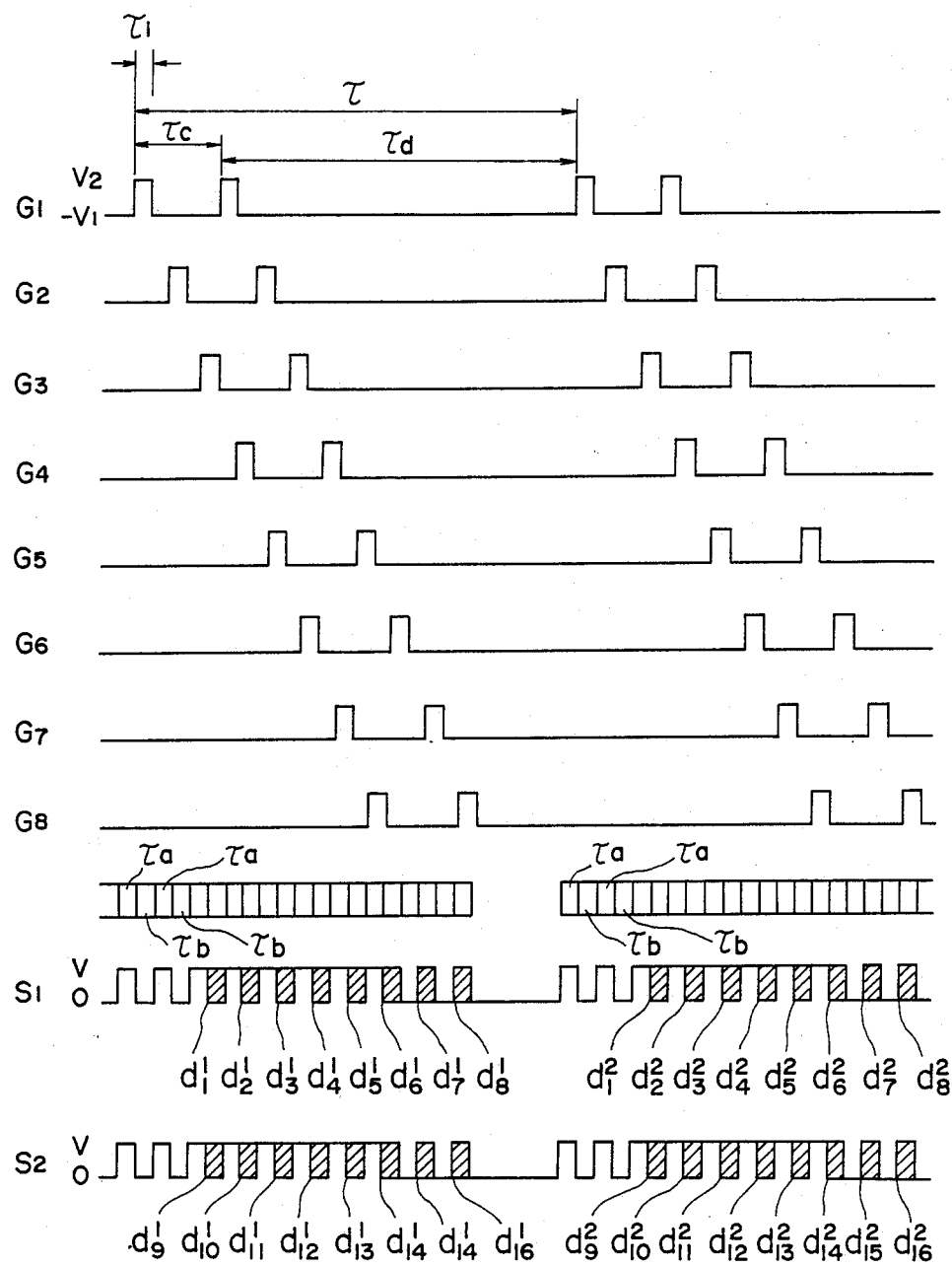
Figure 12:
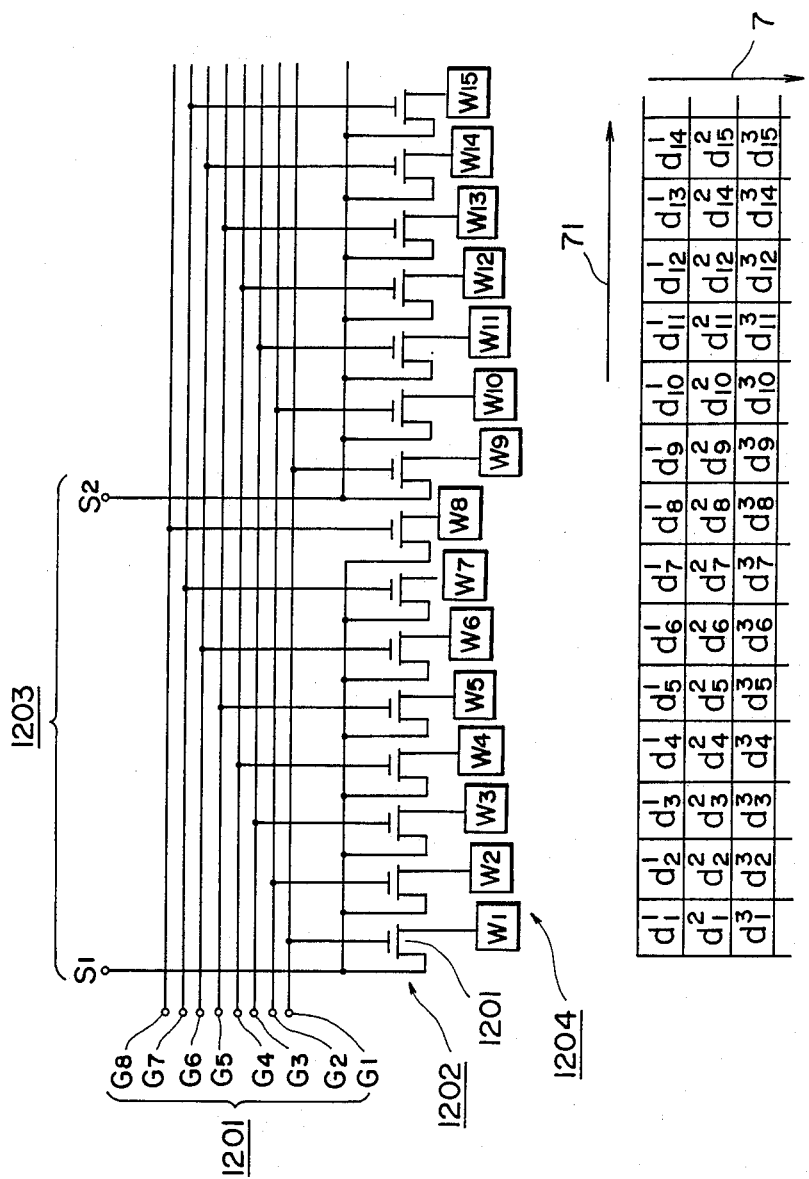
FIG. 12 shows an equivalent circuit of another liquid crystal shutter array in accordance with the present invention.

FIGS. 11 and 12 show a further drive system in accordance with the present invention. FIG. 11 shows the voltage waveforms applied to the gate lines and the voltage waveforms applied to the data electrodes when the number of time-division is 8. A time interval $\tau$ corresponds to a time required for forming one picture element and is given by Eq. (8):

$$\tau = 1/V_p \cdot N \quad (8)$$

where
$V_p$ : processing speed mm/sec; and
N : pel number

In FIG. 11, $\tau a$ and $\tau b$ are so set as to satisfy the relationships of $\tau a \geq \tau_1$ and $\tau b > \tau_1$, where $\tau_1$ is the minimum gate-on time of the TFT. Moreover, $\tau a$ and $\tau b$ are arranged to alternatives appear and constitute the time series. The time (phase) $\tau a$ is a refresh or erasure time wherein an electric field is applied to a liquid crystal so that an aperture is turned off and a potential is applied to the electrode of the aperture so as to prevent the variation in transmittance. The time (phase) $\tau b$ is a data writing time during which a potential is applied to the segment electrode of a micro-shutter in order to control the "ON" and "OFF" states of the aperture.

FIG. 12 shows a TFT matrix 1202, gate lines 1201 connected to the TFTs in the matrix 1202, data lines 1203 and segment electrodes 1204 connected to the apertures $W_1$, $W_2$, . . . , all of which are used in the 8 time-division drive. Of the gate lines 1201, a selected gate line is applied with a voltage $V_2$ only during the refresh time $\tau a$ and the data writing time $\tau b$ within the one-picture-element-forming time interval $\tau$ and a voltage $-V_1$ is applied to the remaining gate lines which are not selected. More particularly, as shown in FIG. 11, during the first refresh time $\tau a$, a voltage $V_2$ is applied to the gate line $G_1$, and a voltage $-V_1$ is applied to the gate line $G_1$ during the succeeding time interval consisting of 2 sets of the data writing time $\tau b$ and the refresh time $\tau a$.

During the next writing time $\tau b$, a voltage $V_2$ is applied to the gate line $G_1$ and, during the remaining one-picture-element-forming interval, the gate line $G_1$ is maintained at $-V_1$. Applied to the next gate line $G_2$ is a gate signal which is obtained by shifting the gate signal applied to the gate line $G_1$ by a time consisting of the refresh time $\tau a$ and the writing time $\tau b$. In like manner, the gate signals which are shifted in time in the manner described above are applied sequentially to the gate lines $G_3$, $G_4$, $G_5$, $G_6$, $G_7$ and $G_8$, respectively. Then, there is formed a sequence of gate signal waveforms wherein the voltage $V_2$ is not simultaneously applied to more than two gate lines.

Next, the operation of the apertures will be described. With respect to the segment electrode connected to the micro-shutter $W_1$, during the time interval $\tau_1$, a potential $+V_2$ is applied to the gate line $G_1$ and a voltage V is applied to the data electrode connected to the data line $S_1$. During the succeeding writing time $\tau b$, the potential of the gate line $G_1$ drops to $-V_1$ so that the TFT 12021 is turned off. As a result, regardless of the potential at the data line $S_1$, the segment electrode of the micro-shutter $W_1$ is maintained at the voltage V. Therefore, during the time interval $\tau_1$, an electric field is always applied to the liquid crystal of the micro-shutter $W_1$ and the micro-shutter $W_1$ is maintained in the "OFF" state. During the succeeding writing time $\tau b$, the potential of the gate line $G_1$ rises to $+V_2$ so that, in order to bring the dot $d_1{}^1$ at a dark level ("OFF" state), the potential of the data line $S_1$ is maintained at V. In order to maintain the dot $d_1{}^1$ at a bright level ("ON" state), the potential of the data line $S_1$ is maintained at 0. In this manner, a potential corresponding to a bright or dark level is applied to the segment electrode of the micro-shutter $W_1$. After the succeeding refresh time $\tau a$, the potential of the gate line $G_1$ is maintained at $-V_1$ until the one-picture-element-forming time interval $\tau$ is terminated and the TFT 12021 is turned off so that a potential corresponding to a bright or dark level is maintained.

Figure 13:
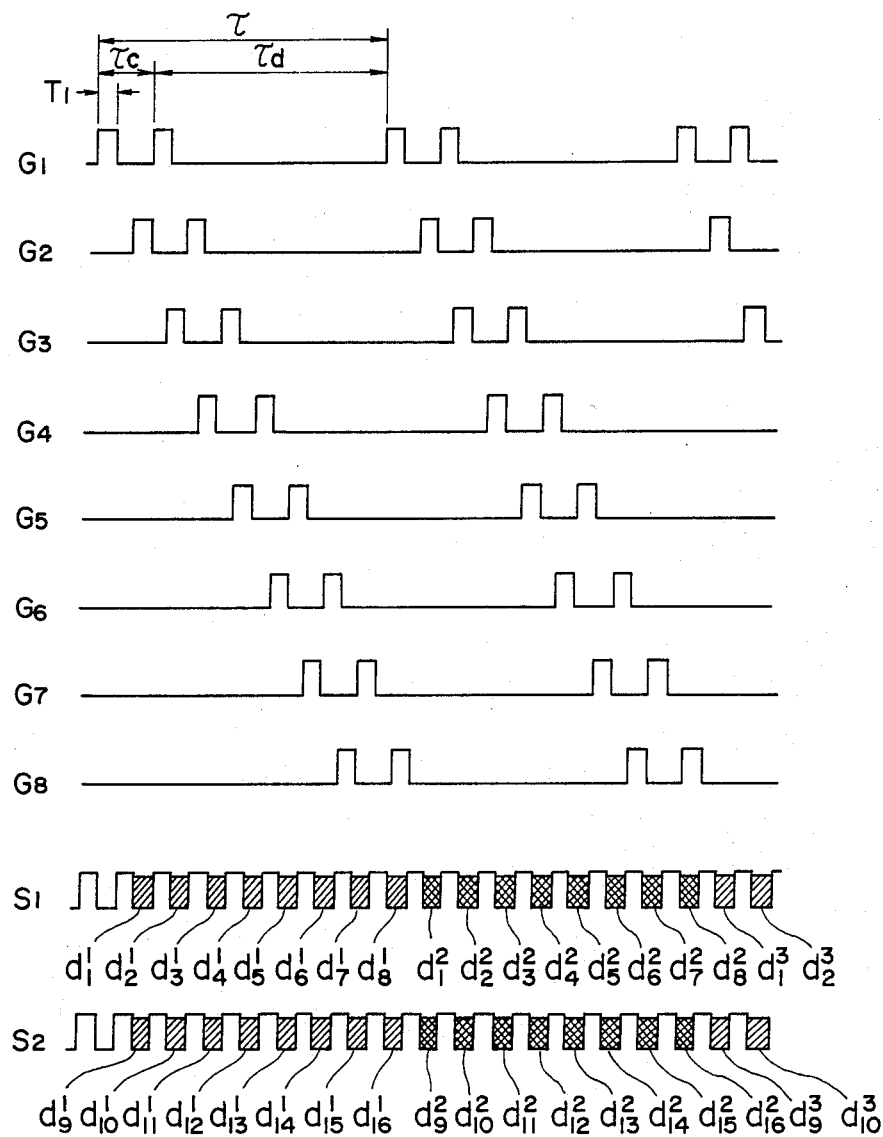
FIGS. 13 and 14 are time charts for applying driving signals to a further liquid crystal shutter array in accordance with the present invention.

FIG. 13 shows a drive system with a maximum number (n) of time-division. It is assumed that the aperture density is 16 dots per millimeter (16 pel); the processing speed is 50 mm/sec; a time interval $\lambda c \approx 240$ $\mu$sec; and a time interval $\tau_1 \approx 78$ $\mu$sec. Then, while the drive system shown in FIG. 9 has a time-division number of 240/78=3, it is possible to realize the 8 time-division drive in the embodiment of FIG. 13.

While in the case of the drive systems as shown in FIGS. 9 and 10, respectively, the on-pulses are successively applied to the adjacent gate lines without any time difference during a time for writing one row, in the drive system described above with reference to FIGS. 11 and 12, there is a time difference of the minimum gate-on time $\tau_1$. Therefore, in an external circuit (an interface for allocating input data for time-division drive), the data transfer speed for transferring data to the data electrodes can be reduced to one half ($\frac{1}{2}$) of that obtained by the drive systems shown in FIGS. 9 and 10. As a result, the circuit can be simplified in construction and the cost can be also reduced.

Furthermore, FIG. 11 does not show an optimum time-division drive system. That is, at a time $\tau d$ no gate-on pulse is applied to any of the gate lines $G_1$–$G_8$. In other words, during the time interval $\tau d$, an off-voltage is applied to all the gate lines. As a result, the data transfer speed at which data is transferred to a buffer connected to each gate line can be slowed down. As a result, the design of the circuit is facilitated and the cost can be advantageously reduced.

Figure 14:
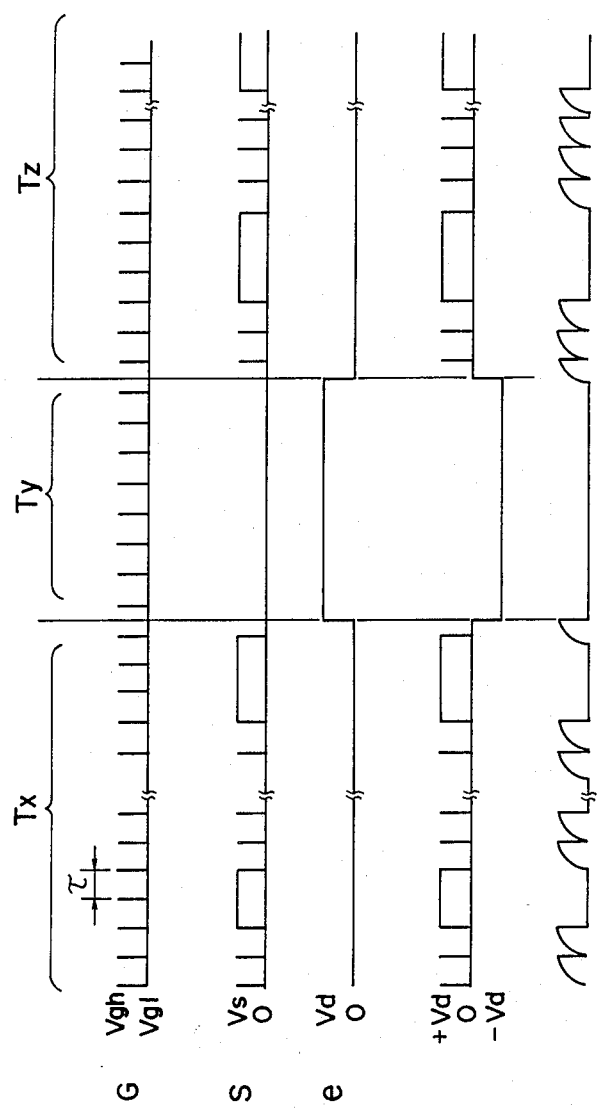
Figure 15:
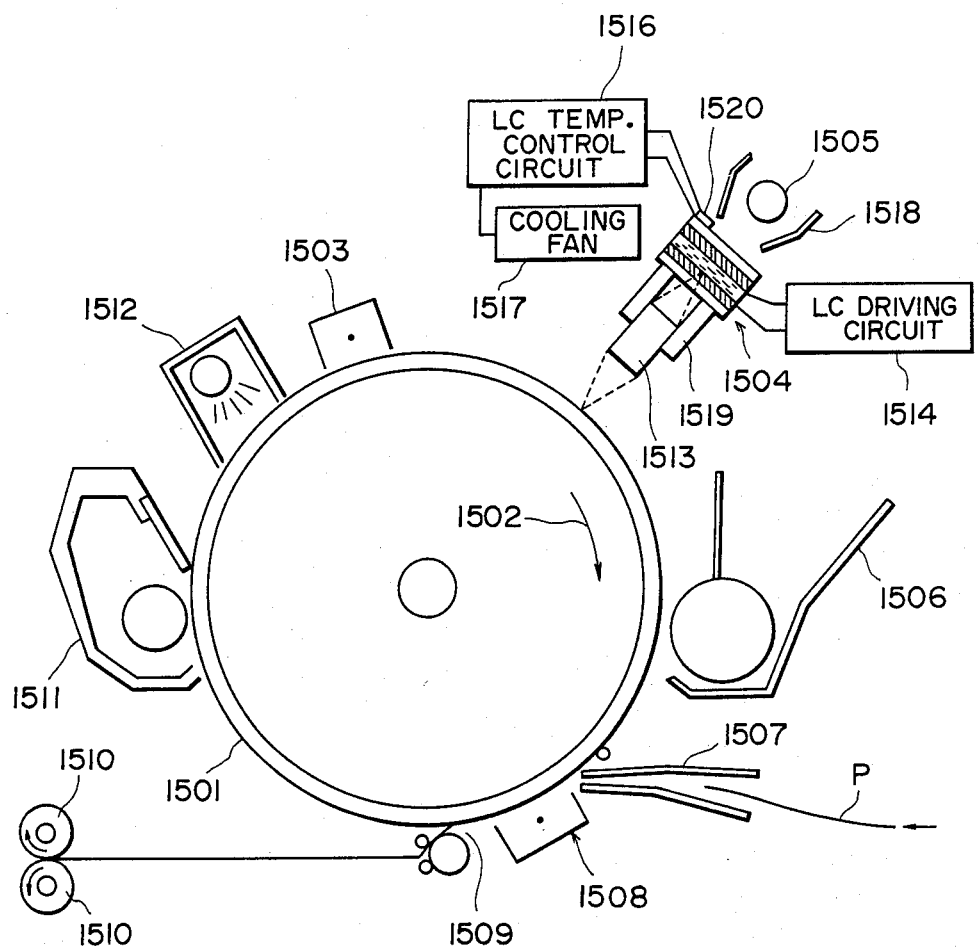
FIG. 15 is a schematic cross sectional view of an image forming apparatus in accordance with the present invention.

According to the present invention, when the liquid crystal shutter array is fit to the optical signal generator as shown in FIG. 5 and a toner image is formed on a cut print (copy paper) by means of an electrophotographic printer as shown in FIG. 15, copy papers must be intermittently fed. During the intermittent-copy-paper-feed time interval Ty, the data electrode is maintained at 0 V while the common electrode is maintained at +Vd as shown in FIG. 14 so that a voltage opposite in polarity to the voltage applied when one picture is formed (for instance during a time Tx when one copy is produced) can be applied across a liquid crystal. In a typical electrophotographic printer, an intermittent-copy-paper feed interval is in general 30–50 mm in terms of distance between successively fed copy papers. Therefore, when it is assumed that the adjacent copy papers are spaced apart from each other by 50 mm and the processing speed is 50 mm/sec, no copy paper passes through the liquid crystal shutter array for one second. Therefore, DC drive is substantially obviated during this time if the polarities of voltages are selected as shown in FIG. 14. As a consequence, the lifetime of the liquid crystal shutter array can be increased.

FIG. 15 shows an electrophotographic printer incorporating the liquid crystal shutter of the type described above. A photosensitive drum 1501 is rotated in the direction indicated by an arrow 1502 and a charger 1503 uniformly charges the cylindrical surface of the photosensitive drum 1501. Thereafter, the liquid crystal shutter array is activated so that the light rays emitted from a light source 1505 disposed behind the liquid crystal shutter array 1504 are selectively transmitted through or interrupted by the liquid crystal shutter array 1504, whereby optical signals are produced. The optical signals thus produced are cast or focused on the charged cylindrical surface of the photosensitive drum 1501 to form an electrostatic latent image.

A developing device 1506 supplies toner to develop an electrostatic latent image thus formed into an toner image which in turn is transferred by means of a transfer charger 1508 onto a copy paper P transported through a transfer guide 1507. The copy paper P bearing the toner image is gradually separated from the photosensitive drum 1501 by means of a separation belt 1509 and the toner image on the copy paper P is fixed by a fixing device 1510. The toner which still remains on the cylindrical surface of the photosensitive drum 1501 after the transfer of the toner image onto the copy paper P is removed by a cleaning device 1511 and the cleaned cylindrical surface of the photosensitive drum 1501 is discharged by a preexposure device 1512 so that the next printing cycle may be operated. The liquid crystal shutter array used in the printer shown in FIG. 15 may be provided with a liquid crystal cell of the type described above with reference to FIG. 2. That is, when the light rays emitted from the exposure light source 1505 are cast on the cylindrical surface of the photosensitive drum 1501 through the liquid crystal shutter array 1504 incorporating a liquid crystal cell and a lens array 1513, a liquid crystal drive circuit 1514 is operated in response to the digital signals represented by image or pattern information obtained from an original or manuscript reader (not shown) so that the liquid crystal shutter array 1504 is turned on and off, whereby the optical signal represented the image or pattern information is focused on the cylindrical photosensitive surface of the drum 1501. In this embodiment, the exposure light source 1505 is also used as a heater for the liquid crystal cells and a liquid crystal temperature control circuit 1516 connected to a heat sensor 1520 drives a liquid crystal cooling fan 1517 so that the liquid crystal cells can be prevented from being overheated and can be maintained at a uniform predetermined temperature. In FIG. 15, reference numeral 1518 designates a reflector; and 1519, a member used to mount the lens array 1513 on the liquid crystal shutter array 1504.

Figure 16:
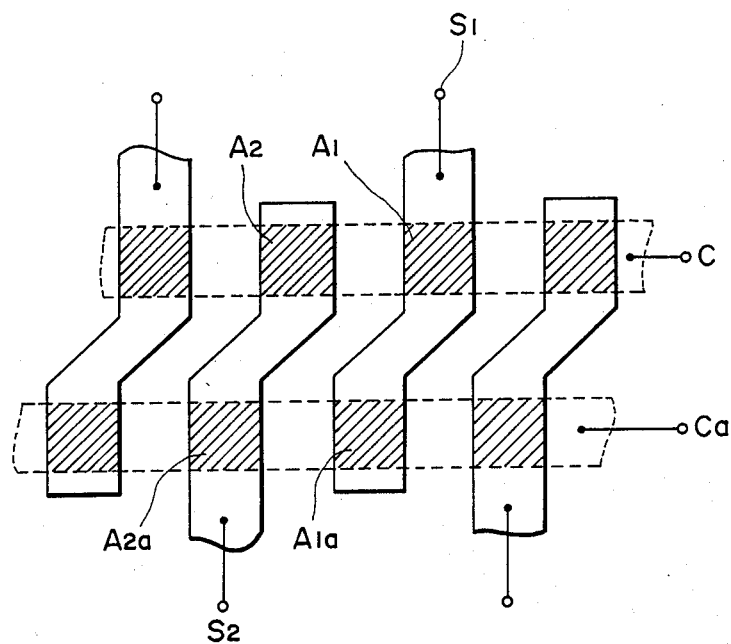
FIG. 16 shows a plan view showing the electrode arrangement of a conventional liquid crystal shutter array and FIG. 17 is a time chart for explaining the driving method thereof.
Figure 17:
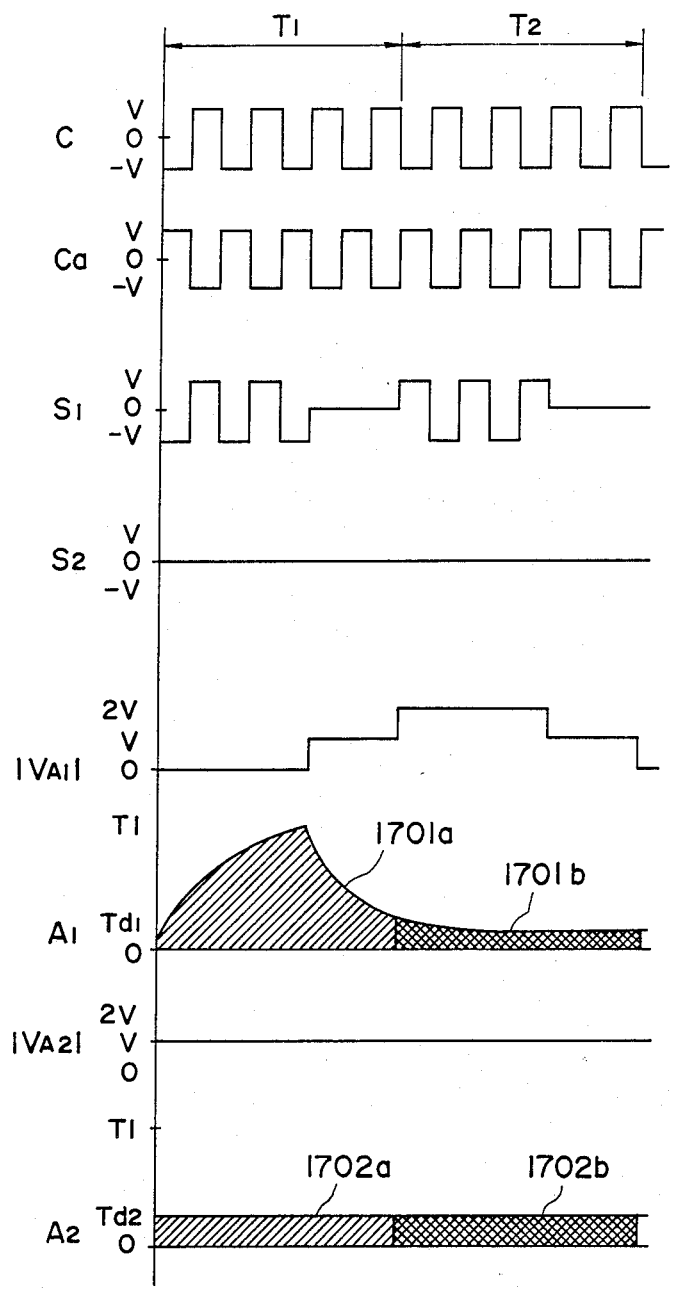

FIG. 16 shows an electrode arrangement of a conventional liquid crystal array not incorporating TFTs and FIG. 17 shows waveforms for driving the electrodes.

For instance, it is assumed that a liquid crystal is of the order of 8 $\mu$m in thickness; a rectangular waveform of ±10V is applied to a common electrode; the voltage waveform equal to that applied to the common electrode is applied to signal electrodes to turn on shutters, while 0 V is applied to them to turn off the shutter respectively, in one selected row. Referring now to FIG. 17, during a time period $T_1$, only $A_1$ is turned on while during a time period $T_2$, only $A_{1a}$ is turned on. An absolute voltage $|V_{A1}|$ is applied to the liquid crystal layer of $A_1$ while an absolute voltage $|V_{A2}|$, to the liquid crystal layer of $A_2$. As described above, when one of the shutters connected to the signal electrode is turned on, 2V, i.e., 20 volts, is applied across the liquid crystal layer but, when all the shutters connected to the signal electrode are turned off, only V, i.e., 10 volts is applied. It follows therefore that the transmittance of $A_1$ is $Td_1$ during the time period $T_2$ while that of $A_2$ remains at $Td_2$ during the time periods $T_1$ and $T_2$ and $T_{2a} > Td_1$.

In this case, one dot is formed during the time periods $T_1$ and $T_2$. Therefore, when the shutter is turned on, the quantity of light incident on a photosensitive drum is in proportion to an area 1701 ($1701a + 1701b$), but when the aperture is turned off, the quantity of light incident on the photosensitive drum is in proportion to an area 1702 ($1702a + 1702b$).

As a result, when the voltage V is low, a satisfactory bright/dark ratio cannot be obtained.

Even when the number of time-division is increased, an area $1702b$ becomes greater relative to an area $1701a$ so that no satisfactory bright/dark ratio cannot be obtained.

It is now assumed that the dot density is 16 dots per mm; the processing speed is 50 mm/sec (corresponding to a speed at which six to eight A4 size prints are produced per minute when a copy paper is fed in its longitudinal direction); and the 2 time division drive scheme is employed. Then $T_1$ becomes 0.625 msec. In FIG. 17, $A_1$ shows the waveform of the variation in transmittance of a liquid crystal shutter at this level. Thus, when the time period $T_1$ is further increased, the transmittance Te is further increased, but the shutter is turned on for a short time so that a satisfactorily high transmittance cannot be obtained.

When $T_1$ is 1.25 msec; the two time division drive scheme is employed; and the voltage is increased twice to ±20V, the bright/dark ratio is increased by about three times when the wavelength of emitted light is 550 nm.

When a bright spot corresponds to a white dot and a dark spot corresponds to a black dot on a photosensitive medium, the bright/dark ratio must be at least higher than five so that an applied voltage must be further increased. The breakdown voltage of CHOS ICs which can be now fabricated at low costs are 30 V at the highest. It follows therefore that, when the number of ICs is intended to be decreased, by increasing the number time-division a decision is urged as to whether an IC device having a high breakdown voltage of 60–80 V is used in order to increase the bright/dark ratio or, alternatively, the density of picture elements is reduced.

Figure 18:
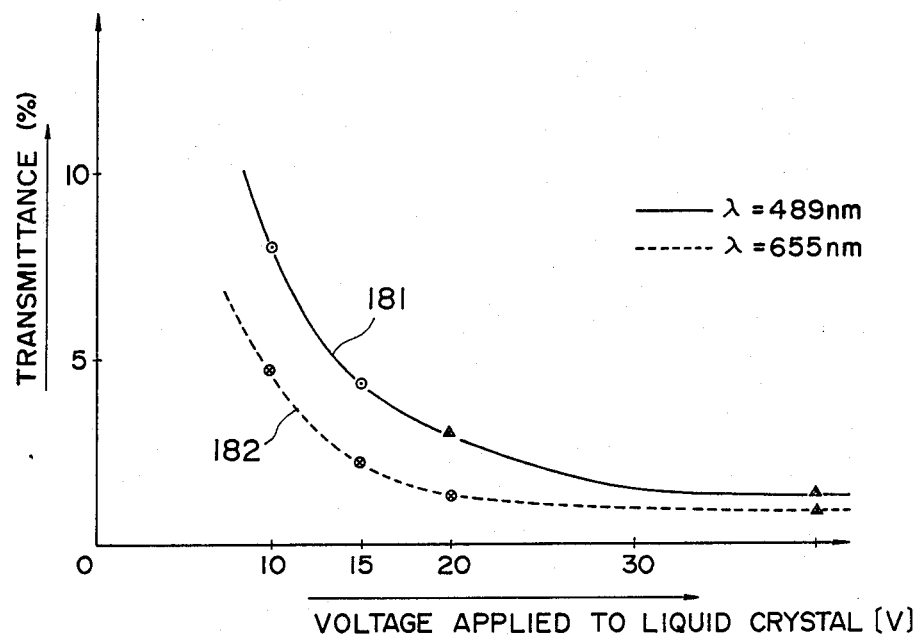
FIG. 18 shows relationships between a voltage and a transmittance in a conventional liquid crystal shutter array.

FIG. 18 shows the results of our experiments; that is relationships between an AC voltage applied across a conventional liquid crystal array (a liquid crystal layer of 8 μm in length) and a transmittance. The transmittance at a wavelength of 489 nm is indicated by a curve 181, while the transmittance at a wavelength of 655 nm, by a curve 182.

As is apparent from FIG. 18, when the voltage $V_{LC}$ applied across the liquid crystal layer is less than 20 V when light has a long wavelength (red side) and when the voltage $V_{LC}$ applied across the liquid crystal layer is less than 30 V when light has a short wavelength (blue side), the transmittance is rapidly increased.

As described above, according to the present invention, by using TFTs for driving a liquid crystal shutter array, even when the time-division drive scheme is employed, a waveform of transmitted light substantially equivalent to that obtained by the direct drive scheme without time-division can be obtained.

More specifically, as the time-division drive scheme can be employed, the data electrodes can be reduced in number (that is, when the picture element density is 16 dots per mm and the whole length is 210 mm, the number of data electrodes =3360 in the case of the direct drive but the number of data electrodes =420 in the case of the 8 time-division drive). Therefore, the following advantages are attained:

(1) The correction (assembly) between a liquid crystal shutter and a driving IC device can be facilitated so that the assembly cost can be reduced.

(2) The number of ICs used can be reduced.

The waveform of light transmitted through the liquid crystal shutter is substantially similar to that obtained in the case of the direct drive so that one-dot writing time can be increased and the energy of light transmitted when the shutter is opened can be increased. When a shutter of the DPA type liquid crystal mode (the liquid crystal mode as shown in FIG. 2) is opened as shown in FIG. 6, light is gradually transmitted. As shown in FIG. 6, the waveform of transmitted light becomes triangle. The energy of the transmitted light is represented by the area A and, if the time is, for instance, doubled, the light energy can be increased to more than two times.

As a result, a contrast ratio [the light energy at a bright spot (the area A)/the light energy at a dark spot (the area B)] can be remarkably increased.

Now, it is assumed that the center wavelength of light emitted from a light source is 540 nm; the density of picture elements is 16 dots per mm; and the processing speed is 50 mm/sec. Then, the contrast ratio is less than 3 in the case of the two time-division drive, but it is increased by about 6.5 times in the case of the direct drive.

We have also found that, when the apertures of a liquid crystal shutter array are driven by TFTs an image with a satisfactory S/N ratio can be formed and that, when the ratio between the channel length L (the distance between the drain and source of a TFT) and the channel width W (the length of the drain of the TFT) of a TFT is selected at a value higher than a certain value, the gate-on pulse can be short-end in time and consequently the processing speed of an electrophotographic printer can be increased.

According to another aspect of the present invention, there is provided a driving method for a transistor array of the type in which capacitance type load elements are arranged in a matrix comprising n rows and m columns and transistors are arranged in a matrix comprising n rows and m columns, each of said capacitance-type load elements having a capacitance C between a segment electrode connected to the drain of a transistor and an opposing electrode; wherein, when the frame frequency of the gate-on pulses applied to said transistors is f and the voltage of the electrical signals applied to the sources of the transistors is Vs, the ratio W/L between the channel length L and the channel W of a transistor is correlated with the frame frequency f of the gate-on pulses and the input signal voltage Vs so as to satisfy the following relationship:

$$1.13 \times 10^9 \times \frac{f \cdot n \cdot c}{V_s} \leq \frac{W}{L} \quad (9)$$

When the ratio between the channel length L and the channel width W of the channel of a transistor, especially a TFT is selected as described above, the drain can derive the output voltage which is 95% or higher of the voltage Vs applied to the source electrode. In practice, it is preferable that the W/L ratio is between 1.4 and 290 and more preferably between 10 and 80. It should be noted that, when the ratio W/L exceeds 290, the gate pulse must be applied for longer than 50 μsec so that a high-speed electrophotographic printer cannot be provided.

Figure 19:
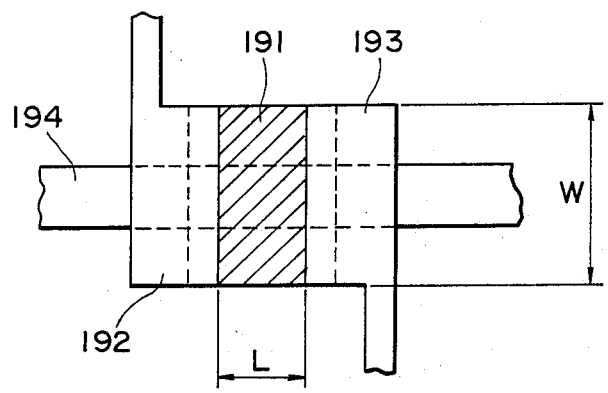
FIG. 19 is a schematic plan view of a thin film transistor used in the present invention.

FIG. 19 is a schematic plan view of a TFT. A drain electrode 193 and a source electrode 192 connected to a data line are formed in contact with a semiconductor film (amorphous silicon, polysilicon, tellurium, etc.) and a gate electrode 194 underlies the semiconductor film 191 through an insulating film (not shown). The channel width is represented by W while the channel length is represented by L which corresponds to the distance between the source electrode 192 and the drain electrode 193.

According to the present invention, the ratio W/L between the channel length L and the channel width W of a thin film transistor; the gate pulse frequency f; and the data signal voltage Vs satisfy the relationship expressed by Eq. (9) as described above, so that an ultra-high speed drive can be realized. For instance, it is assumed that the ratio W/L=100 μm 5 μm; the capacitance of a liquid crystal which is a capacitance type load element is 0.2 pF; and the data signal voltage Vs is 22 V. Then, the drain electrode can dririve an output signal of 20 volts which is higher than 95% and the minimum gate-on pulse time becomes about 5 μsec. In this case, the number of time-division becomes 48. It is preferable that the channel length L is 5 μm or longer and that the channel width is between 7 μm and 1.4 mm. It is more preferable that the channel width be between 50 and 400 μm. According to the present invention, the frame frequency of gate-on pulses is preferably higher than 500 Hz and more preferably 800 Hz–2 MHz. It follows therefore that the gate pulse can be applied for 0.24–50 μsec and especially for 1.25–10 μsec. The data signal voltage Vs is preferably higher than 15 V and more preferably 20–60 V.

In the case of a TFT whose channel length L and channel width W cannot satisfy the above-describe Eq. (9), the output signal derived by the drain electrode is less than 95% of the data signal Vs so that a satisfactory shutter efficiency cannot be obtained. As a result, in the case of formation of an image, the S/N ratio becomes less than five so that no satisfactory copy image cannot be obtained.

Especially when the ratio W/L exceeds 290, the gate pulse must be applied for a time longer than 50 μsec so that a high speed electrophotographic printer (for instance, capable of producing more than 10 copies per minute) cannot be realized. In a preferred embodiment of the present invention, the ratio W/L is selected between 10–80 so that the gate pulse can be applied for 1.25–10 μsec.

The semiconductor film 191 of the TFT used preferably consists of amorphous silicon doped with hydrogen atoms. The thickness of the semiconductor film 191 may be suitably selected and is in general between 1000–3000 Å. It is preferable that the gate insulating film formed of silicon nitride doped with hydrogen atoms and that the thickness of the gate insulating film is 3000–6000 Å.

The TFT of the type described just above may be used instead of TFTs used in embodiments of FIGS. 3–15.

According to the present invention, when the above-described Eq. (9) is satisfied, a high order or more than 30 time-division drive system may be employed.

We have further found that each of the apertures of a liquid crystal array is switched by means of a TFT so that an image with a satisfactory S/N ratio can be formed and that when a parasitic capacitance Cgd which exists between the gate and drain of a TFT is selected at a value less than a predetermined value, charge sharing can be reduced and a required level of drain voltage $V_D$ for driving the liquid crystal shutter array is obtained.

The present invention further provides a driving method for a transistor array of the type in which capacitance type load elements are arranged in a matrix comprising n rows and m columns and transistors are arranged in a matrix comprising n rows and m columns, each of said capacitance-type load elements having a capacitance C between a segment electrode connected to the drain of a transistor and an opposing electrode; wherein, the parasitic capacitance Cgd which exists between the gate and drain of each transistor is corre-lated with the above-described capacitance values C and $C_E$ so as to satisfy the following Eq. (10):

$$C_{gd} \leq \frac{0.05(C + C_E)}{\frac{\Delta V_g + \Delta V_0}{V_s} - 0.05} \quad (10)$$

where
ΔVd: variation in gate voltage;
ΔV₀: variation in voltage on the opposing electrode; and
Vs: the maximum value of the input signal.

According to the embodiment, as described above, the parasitic capacitance Cgd between the gate and drain of a TFT is selected as defined by Eq. (10) so that the drain voltage which is the output signal in response to the input signal voltage Vs applied through the data line can be obtained at a rate higher than 95%. Furthermore, a discharge time which is dependent upon a time constant defined by the OFF resistance Roff of a TFT and the capacitance C of a capacitance type load element (for instance, a liquid crystal) can be increased. In practice, it is preferable the parasitic capacitance Cgd is 45 pF and it is more preferable that it is 0.2–1.5 pF. Especially when the parasitic capacitance Cgd exceeds 45 pF, a sufficiently high drain voltage cannot be obtained so that a desired shutter efficiency cannot be attained. As a result, a high quality image cannot be formed. Moreover, discharge of the capacitance C becomes fast so that in the case of a higher order time-division drive, for instance, in the case of a 4 time-division drive, discharge of the capacitance C occurs even before one frame is completed.

Figure 20A:
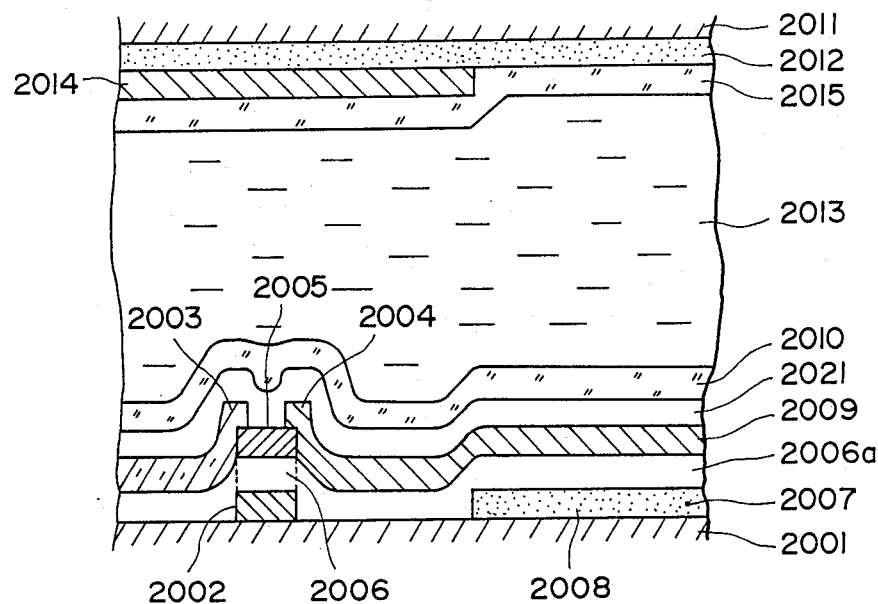
FIG. 20A is a sectional view of a liquid crystal element incorporating a thin film transistor in accordance with the present invention.

FIG. 20A shows in section a liquid crystal device which is used in the present invention and in which a TFT is formed on a substrate 2001 (such as glass, plastic, etc.). The TFT comprises a gate electrode 2002 connected to a gate line to which is applied a gate-on pulse at a frame frequency f, a source electrode 2003 connected to a data line to which is applied a data signal of Vs and a drain electrode 2004 for deriving an output signal in response to the data (input) signal. The drain electrode 2004 is connected to a segment electrode 2009 which constitutes a micro-shutter. When a scanning signal is applied to the gate electrode 2002, the resistance of an amorphous silicon film 2005 drops so that the source electrode 2003 and the drain electrode 2004 are electrically interconnected to each other. The drain electrode 2004 is connected to a charge storage capacitor $C_E$ comprising a conduction film or a capacitor electrode (ITO: Indium Tin Oxide), an insulating film 2006a and the segment electrode 2009. The conduction film or capacitor electrode 2007 is preferably similar in shape to the segment electrode 2009 and is disposed in opposed relationship thereto through the insulating film 2006a, conduction film 2007 may be formed over the whole surface of the substrate 2001 in such a way that it is electrically isolated from the gate electrode 2002. FIG. 20C shows an equivalent circuit in which a gate is denoted by G; a source, by S; and a drain, by DD.

In the TFT used in the present invention, a gate insulating film 2006 and the insulating film 2006a which are interposed between the gate electrode 2002 and the amorphous silicon film 2005 are formed of silicon nitride doped with hydrogen atoms and 6000 Å in thickness (with a relative dielectric constant: 6.6). The silicon nitride film is formed by the glow discharge over the whole surface of the substrate 2001 having a pattern of the gate electrode 2002 formed by the vacuum deposition technique using chromium and aluminum and a pattern of the segment electrode 2009 formed by the vacuum deposition technique using ITO (Indium Tin Oxide). It should be noted that the drain electrode 2004 and the segment electrode 2009 are electrically interconnected to each other as described above.

An insulating film 2021 consisting of a silicon nitride film doped with hydrogen atoms and an orientation control film 2010 of polyimide and 1000 Å in thickness are further formed over the substrate 2001 upon which have been constructed the thin film transistor and the segment electrode 2009.

In the liquid crystal device used in the present invention, an NP type nematic liquid crystal 2013 is interposed between the TFT-matrix substrate upon which the thin film transistors of the type described above are arranged in a matrix array and an opposing substrate 2011 in such a way that the molecules of the liquid crystal are oriented in the manner as shown in FIG. 2. A common electrode of an ITO film 2012 is formed over the surface of the opposing substrate 2011 and, in the case of the liquid crystal shutter array of the type described before, a light shielding film 2014 of a chromium/aluminum lamination film is formed over the opposing substrate 2014 to optically shield the portion except an aperture, thereby defining a micro-shutter. A polyimide orientation control film 2015 is formed over the common electrode 2012 and the light-shielding film 2014.

Figure 20B:
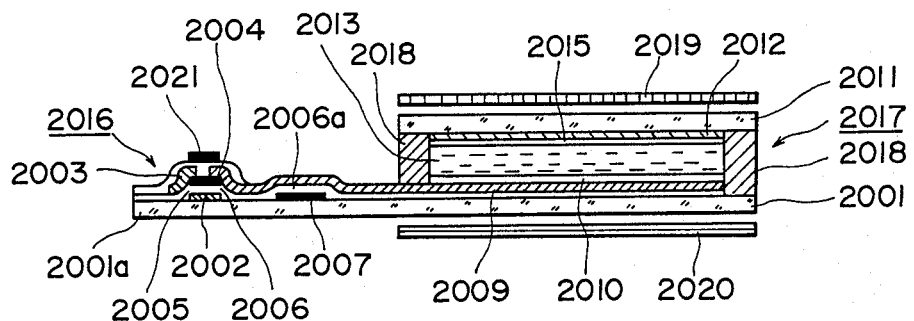
FIG. 20B is a schematic sectional view of a liquid crystal element in accordance with the present invention.
Figure 20C:
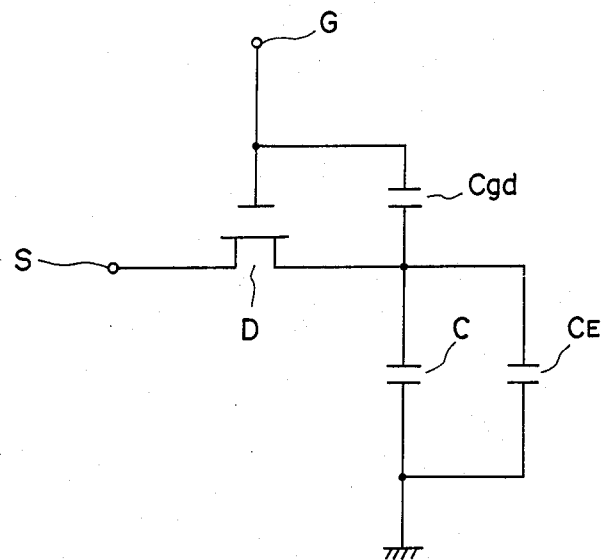
FIG. 20C is an equivalent circuit diagram thereof.

FIG. 20B shows schematically in section another liquid crystal shutter array which may be used in the present invention. In this shutter array, a TFF 2016 is constructed on the same substrate 2021 of a liquid crystal device 2017, but is spaced apart therefrom by a suitable distance. It is preferable that the TFT 2016 is disposed outside of an epoxy-resin-adhesive sealing member 2018 for sealing the liquid crystal 2013 between the substrate 2001 of the liquid crystal element 2017 and the opposing substrate 2011 with the common electrode 2012. Alternatively, the TFT 2016 may be formed on a separate board with an exterior circuit (not shown) such as an IC (integrated circuit) instead of being formed on the substrate 2001 of the liquid crystal device 2017. Same reference numerals are used to designate similar parts throughout FIGS. 20A and 20B. Cross-nicol polarizers 2019 and 2020 are disposed above and below the substrates 2011 and 2001, respectively, and a chromium-aluminum light-shielding film 2021 is formed above the semiconductor film 2005 of the TFT 2016.

According to the present invention, the parasitic capacitance Cgd between the gate and the drain in the channel of the TFT satisfies the above-described Eq. (10) so that the drain electrode of the TFT can derive an output voltage which corresponds to 95% or higher of the data signal and concurrently the discharge time of the capacitance C can be considerably increased when the TFT is turned off.

In order to construct a TFT which can satisfy the above-described Eq. (10), it is preferable to employ a self-alignment method to be described below.

Referring now to FIGS. 21A–21D, a conduction film consisting of a lamination of a chromium metal film of 500 Å in thickness and an aluminum metal film of 5500 Å in thickness is formed over the surface of a glass substrate 211 and is etched to form a gate electrode 212 of a TFT. Formed over the gate electrode 212 is a gate insulating film 213 of 6000 Å in thickness with a silicon nitride film doped with hydrogen atoms, and a semiconductor film 214 of an amorphous silicon film of 2000 Å in thickness and doped with hydrogen atoms is formed over the gate insulating film 213.

A positive type photoresist film 215 is applied over the surface of the glass substrate 211 upon which are formed a gate electrode or conduction film 212, a silicon nitride film 213 giving a gate insulating film and a semiconductor film of amorphous silicon film 214. When light E is illuminated from the back or lower surface of the glass substrate 211 as indicated by an arrow E, the gate electrode 212 serves as a mask so that a portion of the photoresist film 215 which is masked by the gate electrode 212 is not exposed while the remaining portion of the photoresist film 215 is exposed.

Figure 21:
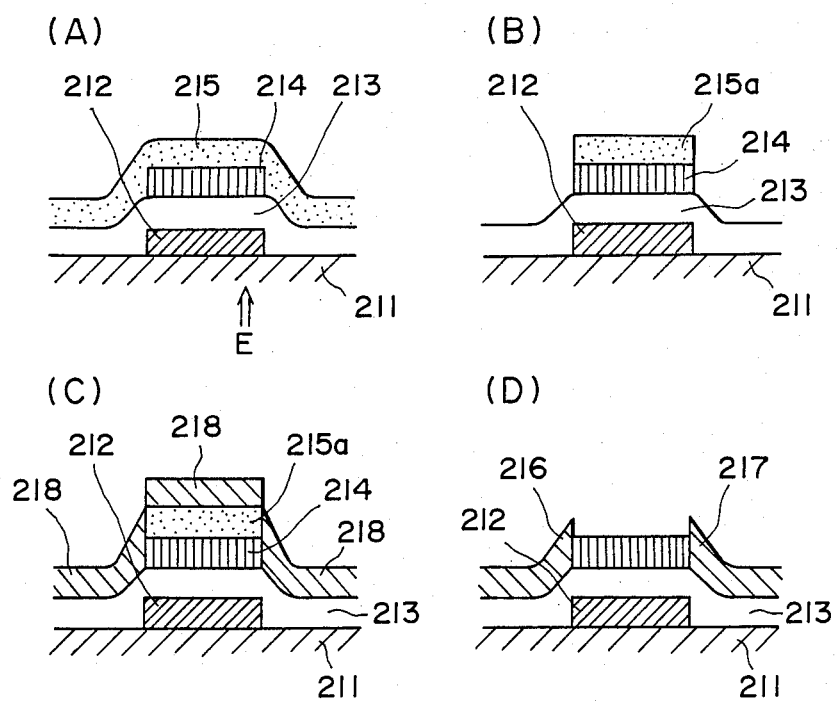
FIGS. 21A–21D are sectional views for explaining the steps of a self-alignment method used in the present invention.

Next, as shown in FIG. 21B, a prescribed developing agent is used to develop the photoresist film 215, whereby only the unexposed portion of the photoresist film 215a remains. Thereafter, as shown in FIG. 21C, a conduction film 218 formed of a lamination of a chromium metal film of 500 Å in thickness and as aluminum metal film of 5500 Å in thickness is formed over the whole surface. Then, as shown in FIG. 21D, the photoresist film 215a is dissolved away and the conduction film 218 formed upon the photoresist film 215a is removed together. As a result, only the conduction films which become the source electrode 216 and the drain electrode 217, respectively, remain on the glass substrate 211.

When the self-alignment method of the type described above is employed, the overlapping of the gate electrode 212 and the drain electrode 217 can be substantially reduced to less than 0.1 μ in width so that the parasitic capacitance $C_agd$ between the gate and drain can be reduced to 0.004 pF (picofarads) or less as indicated by Eq. (11) below:

$$C_agd \leq \frac{0.05C}{\frac{\Delta Vg + \Delta V_0}{Vs} - 0.05} = 0.004 \text{ pF} \quad (11)$$

where $\Delta Vg$, $\Delta V_0$ and $Vs$ are defined in Eq. (10).

In a preferred embodiment of the present invention, in Eq. (10), $\Delta Vg$ can be set to a high-level Vgh of the order of 40 V and to a low-level Vge of the order of $-10$ V with a gate-on pulse of the order of 4 μsec. Preferably $\Delta V_0$ and Vs are higher than 15 V and, more preferably, 20 to 60 V. The capacitance C varies depending upon the kinds or types of liquid crystals used and is preferably 0.1–0.3 pF. The capacitance $C_E$ also varies depending upon the kinds of insulating films used and preferably is 0.7–1.5 pF and more preferably, 0.8–1.0 pF.

What is claimed is:

1. In an image forming apparatus comprising an exposure light source, a printer head which comprises a plurality of microshutters arranged in at least one line and each controlling the transmission or interruption of light from said exposure light source, and an image bearing member so disposed to be irradiated with light signals transmitted through the printer head; the improvement wherein each of said plurality of microshutters is connected to one of a plurality of thin film transistors, said plurality of thin film transistors are divided into a plurality of groups each comprising a prescribed number of thin film transistors which are connected in common to one source line and are connected separately to different gate lines; and each of said different gate lines is commonly connected to a plurality of thin film transistors each belonging to one of said plurality of groups.

2. An image forming apparatus according to claim 1 wherein said plurality of microshutters are formed on a substrate having thereon a plurality of segment electrodes each forming a shutter and connected to a drain of a thin film transistor, another substrate having thereon a common electrode, and a liquid crystal interposed between the substrates.

3. An image forming apparatus according to claim 1, wherein an electric field strength of $5 \times 10^5$ V/cm or below is applied to a gate insulating film at the channel of said thin film transistor.

4. An image forming apparatus according to claim 2, wherein said thin film transistors are formed outside of a sealing member for sealing said liquid crystal between said substrates.

5. An image forming apparatus according to claim 2, wherein said thin film transistors and the segment electrodes of the microshutters are on the same substrate.

6. An image forming apparatus according to claim 4, wherein said thin film transistors are formed on an exterior circuit board.

7. An image forming apparatus according to claim 1, wherein said thin film transistors comprise a semiconductor of amorphous silicon.

8. An image forming apparatus according to claim 2, which further comprises means for applying gate-on pulses sequentially to the gate electrodes of said plurality of thin film transistors.

9. An image forming apparatus according to claim 2, wherein said liquid crystal is a nematic liquid crystal.

10. An image forming apparatus according to claim 1, which further comprises pre-charging means by which said image bearing member is pre-charged, so that the pre-charged image bearing member is exposed with the optical signal from said printer head to form an electrostatic image thereon, and developing means for developing the electrostatic image.

11. An image forming apparatus according to claim 1, which further comprises pre-charging means by which said image bearing member is pre-charged so that the pre-charged image bearing member is exposed with the optical signal from said printer head to form an electrostatic image thereon, developing means for developing the electrostatic image to form a toner image, and means for transferring the toner image.

12. An image forming apparatus according to claim 1, wherein said image bearing member is a rotatable photosensitive drum.

13. An image forming apparatus according to claim 12, wherein said photosensitive drum comprises a photosensitive layer formed of an organic photoconductive material.

14. An image forming apparatus according to claim 12, wherein said photosensitive drum comprises a photosensitive layer formed of amorphous silicon.

15. A driving method for an image forming apparatus of the type comprising an exposure light source, a printer head which comprises a group of micro-shutters each controlling the transmission or interruption of light from said exposure light source, and an image bearing member so disposed to be irradiated with light signals transmitted through the printer head; said group of micro-shutters are arranged in a matrix comprising a plurality of rows and a plurality of columns; said group of micro-shutters are formed by a substrate having thereon a plurality of the segment electrodes each forming a shutter and connected to a drain of a thin film transistor, another substrate having thereon a common electrode, and a liquid crystal interposed between the substrates;

said driving method comprising, during a period for writing in a selected row among said plurality of rows, a first period for applying an electric voltage providing a light interrupting state between segment electrodes corresponding to said selected row and the common electrode, and a second period for applying an electric voltage providing a light transmitting state between a selected segment electrode among the segment electrodes corresponding to said selected row.

16. A driving method according to claim 15, wherein immediately before said first period, said exposure light source is caused to emit a light pulse or the quantity of light emitted therefrom is increased.

17. A driving method according to claim 15, wherein an electric signal having a pulse duration equal to the sum of said first period and said second period is applied sequentially to the gate lines of thin film transistors.

18. A driving method according to claim 15, wherein electric signals are alternately applied to gate lines during said first period and said second period.

19. A driving method for an image forming apparatus of the type comprising an exposure light source, a printer head which comprises a group of micro-shutters each controlling the transmission or interruption of light from said exposure light source, and an image bearing so disposed to be irradiated with light signals transmitted through the printer head; said group of micro-shutters are arranged in a matrix comprising a plurality of rows and a plurality of columns; said group of micro-shutters are formed by a substrate having thereon a plurality of segment electrodes each forming a shutter and connected to a drain of a thin film transistor, another substrate having thereon a common electrode, and a liquid crystal interposed between the substrates;

said image forming method comprising:

a first period for applying a scanning signal to gate lines of the thin film transistors and applying an electric signal providing a light interrupting state to data lines in synchronism with the scanning signal, and a second period, after the first period, for applying a scanning signal to gate lines of thin film transistors corresponding to a row and applying, in synchronism with the scanning signal, an electric signal providing a light transmitting states to data lines connected to selected segment electrodes among the segment electrodes corresponding to said row to which the scanning signal is applied.

20. A driving method for an image forming apparatus of the type comprising an exposure light source, a printer head which comprises a group of micro-shutters each controlling the transmission or interruption of light from said exposure light source, and an image bearing so disposed to be irradiated with light signals transmitted through the printer head; said group of micro-shutters are arranged in a matrix comprising a plurality of rows and a plurality of columns; said group of micro-shutters are formed by a substrate having thereon a plurality of segment electrodes each forming a shutter and connected to a drain of a thin film transistor, another substrate having thereon a common electrode, and a liquid crystal interposed between the substrates;

said driving method comprising:

a first period for applying a scanning signal to gate lines of the thin film transistors; applying, in synchronism with the scanning signal, an electric signal corresponding to image information to data lines thereby to form a light transmitting state at selected micro-shutters among the group of micro-shutters and produce a light signal; and irradiating the image bearing member with the light signal for a predetermined period; and a second period, after the first period, for applying to the liquid crystal a voltage of a polarity opposite to that of the voltage applied to the liquid crystal during the first period.

21. A driving method for an image forming apparatus of the type comprising an exposure light source, a printer head which comprises a group of micro-shutters each controlling the transmission or interruption of light from said exposure light source, and an image bearing so disposed to be irradiated with light signals transmitted through the printer head; said group of micro-shutters are arranged in a matrix comprising a plurality of rows and a plurality of columns; said group of micro-shutters comprise electrodes connected to scanning lines, electrodes connected to data lines and a liquid crystal;

said driving method comprising:

a first period for applying a scanning signal to the scanning lines and applying an electric signal providing a light interrupting state to data lines in synchronism with the scanning signal, and a second period, after the first period, for applying a scanning signal to the scanning lines and applying an electric signal providing a light transmitting state to selected data lines in synchronism with the scanning signal.

22. A driving method for an image forming apparatus of the type comprising an exposure light source, a printer head which comprises a group of microshutters each controlling the transmission or interruption of light from said exposure light source, and an image bearing so disposed to be irradiated with light signals transmitted through the printer head; said group of micro-shutters are arranged in a matrix comprising a plurality of rows and a plurality of columns; each micro-shutter comprises a liquid crystal interposed between a pair of electrodes;

said driving method comprising:

a first phase for applying an electric signal providing a light interrupting state to a selected row of micro-shutters among said group of micro-shutters, a second phase for applying an electric signal providing a light transmitting state to selected micro-shutters among the micro-shutters in the light interrupting state, and a third phase interposed between the first and second phases for applying an electric signal providing a light transmitting state to another row of microshutters.

23. A driving method according to claim 22, wherein one of said pair of electrodes is connected to a drain of a thin film transistor.

24. A driving method for a transistor array of the type in which capacitance type load elements are arranged in a matrix comprising n rows and m columns and transistors are arranged in a matrix comprising n rows and m columns, each of said capacitance type load elements having a capacitance C between a segment electrode connected to the drain of a transistor and an opposing electrode; wherein, when the frame frequency of gate-on pulses applied to said transistors is represented by f and an electrical signal applied to the source of each transistor has a voltage Vs, the ratio W/L (where L is the channel length and W is the channel width in the channel of each transistor) is correlated with said frame frequency f of gate-on pulses and said input signal voltage Vs so as to satisfy the following relationship:

$$1.13 \times 10^9 \times \frac{f n c}{V s} \leq \frac{W}{L}$$

25. A driving method according to claim 24, wherein said transistors are thin film transistors.

26. A driving method according to claim 25, wherein each of said thin film transistors comprises a semiconductor of amorphous silicon.

27. A driving method according to claim 24, wherein said input signal voltage Vs is 15 volts or higher.

28. A driving method according to claim 24, wherein said input signal voltage Vs is between 20 and 60 volts.

29. A driving method according to claim 24, wherein said W/L ratio is between 1.4 and 290.

30. A driving method according to claim 24, wherein said W/L ratio is between 10 and 80.

31. A driving method according to claim 24, wherein said capacitance type load element is a liquid crystal.

32. A driving method for a transistor array of the type in which capacitance type load elements are arranged in a matrix comprising n rows and m columns and transistors are arranged in a matrix comprising n rows and m columns, each of said capacitance type load elements having a capacitance C between a segment electrode connected to the drain of a transistor and an opposing electrode; wherein, a parasitic capacitance Cgd between the gate and drain in the channel of each transistor is correlated with said capacitance C and said capacitance CE so as to satisfy the following relationship:

$$C_{gd} \leq \frac{0.05(C + CE)}{\frac{\Delta V_g + \Delta V_0}{V_s} - 0.05}$$

where $\Delta V_g$: the variation in the gate voltage;

$\Delta V_0$: the variation in the voltage on the opposite electrode; and

Vs: the maximum input signal.

33. A driving method according to claim 32, wherein said parasitic capacitance Cgd is 45 pF (picofarads) or less.

34. A driving method according to claim 32, wherein said parasitic capacitance Cgd is between 0.2 and 1.5 pF.

35. A driving method according to claim 32, wherein said transistors are thin film transistors.

36. A driving method according to claim 35, wherein said thin film transistors comprise a semiconductor of amorphous silicon.

37. A driving method according to claim 32, wherein said capacitance type load element is a liquid crystal.

38. A driving method according to claim 32, wherein the maximum value Vs of said input signal voltage is 15 volts or higher.

39. A driving method according to claim 32, wherein the maximum value Vs of said input signal voltage is between 20 and 60 volts.

* * * * *

UNITED STATES PATENT AND TRADEMARK OFFICE
CERTIFICATE OF CORRECTION

PATENT NO. : 4,884,079
DATED : November 28, 1989
INVENTOR(S) : HIROSHI INOUE, ET AL.

Page 1 of 3

It is certified that error appears in the above-identified patent and that said Letters Patent is hereby corrected as shown below:

Title page:

IN [56] REFERENCES CITED

U.S. PATENT DOCUMENTS, "4,676,616" should read --4,671,616--.

IN [57] ABSTRACT

Line 5, "image bearing" should read --image bearing member--.

COLUMN 2

Line 30, "image bearing" should read --image bearing member--.

COLUMN 3

Line 56, delete "DC".

COLUMN 4

Line 5, "1-$Lm$ exp[-1" should read --1-$Lm$[exp - --.

COLUMN 6

Line 32, "data-line group" should read --data-line group 403--.

UNITED STATES PATENT AND TRADEMARK OFFICE
CERTIFICATE OF CORRECTION

PATENT NO. : 4,884,079
DATED : November 28, 1989
INVENTOR(S) : HIROSHI INOUE, ET AL.

Page 2 of 3

It is certified that error appears in the above-identified patent and that said Letters Patent is hereby corrected as shown below:

COLUMN 7

Line 68, "$\tau_{12}(\tau_{11}+\tau_{12}T_{11})$," should read --$\tau_{12}(\tau_{11}+\tau_{12} = T_{11})$,--.

COLUMN 8

Line 33, "voltage curve $|W-C|$" should read --voltage curve $|W_1-C|$--.

COLUMN 11

Line 65, "alternatives" should read --alternatively--.

COLUMN 12

Line 42, "TFT 12021" should read --TFT 1202--.
Line 60, "TFT 12021" should read --TFT 1202--.

COLUMN 17

Line 4, "W/L = 100 µm 5 µm" should read --W/L = 100 µm/5 µm--.

COLUMN 18

Line 60, "DD." should read --D.--.

UNITED STATES PATENT AND TRADEMARK OFFICE
CERTIFICATE OF CORRECTION

PATENT NO. : 4,884,079

DATED : November 28, 1989

INVENTOR(S) : HIROSHI INOUE, ET AL.

Page 3 of 3

It is certified that error appears in the above-identified patent and that said Letters Patent is hereby corrected as shown below:

COLUMN 22

Line 12, "between" should read --between the--.
    Line 35, "bearinq" should read --bearing member--.
    Line 55, "light transmitting states" should read --light transmitting state--.
    Line 65, "bearing" should read --bearing member--.

COLUMN 23

Line 26, "bearing" should read --bearing member--.
    Line 49, "bearing" should read --bearing member--.

Signed and Sealed this

Sixteenth Day of April, 1991

Attest:

HARRY F. MANBECK, JR.

Attesting Officer

Commissioner of Patents and Trademarks